(12) United States Patent
Brown et al.

(10) Patent No.: US 8,801,319 B2
(45) Date of Patent: Aug. 12, 2014

(54) BIASED HINGE FOR EQUIPOISING SUPPORT EQUIPMENT

(75) Inventors: Garrett W. Brown, Philadelphia, PA (US); Anthony D. Sacksteder, Philadelphia, PA (US)

(73) Assignee: Garrett W. Brown, Philadelphia, PA (US)

( * ) Notice: Subject to any disclaimer, the term of this patent is extended or adjusted under 35 U.S.C. 154(b) by 1017 days.

(21) Appl. No.: 12/569,498

(22) Filed: Sep. 29, 2009

(65) Prior Publication Data

US 2010/0065705 A1    Mar. 18, 2010

Related U.S. Application Data

(63) Continuation-in-part of application No. 12/530,023, filed as application No. PCT/US2008/056511 on Mar. 11, 2008, now abandoned.

(60) Provisional application No. 60/894,571, filed on Mar. 13, 2007, provisional application No. 61/019,350, filed on Jan. 7, 2008, provisional application No. 61/101,406, filed on Sep. 30, 2008.

(51) Int. Cl.
| | |
|---|---|
| *G03B 17/00* | (2006.01) |
| *F16M 11/04* | (2006.01) |
| *F16M 13/04* | (2006.01) |
| *F16M 11/20* | (2006.01) |
| *F16M 11/08* | (2006.01) |
| *E05D 3/12* | (2006.01) |
| *E05D 11/10* | (2006.01) |

(52) U.S. Cl.
CPC ............ *F16M 11/08* (2013.01); *E05Y 2900/60* (2013.01); *E05D 3/12* (2013.01); *F16M 11/04* (2013.01); *F16M 2200/045* (2013.01); *E05D 11/105* (2013.01); *F16M 13/04* (2013.01); *F16M 11/2014* (2013.01)
USPC ........................................... 403/62; 403/145

(58) Field of Classification Search
USPC ............ 403/53, 55, 62, 82, 145; 248/281.11, 248/28.11, 284.1, 288.51, 292.11–292.14; 16/286, 287, 288, 289, 366
See application file for complete search history.

(56) References Cited

U.S. PATENT DOCUMENTS

| | | | | |
|---|---|---|---|---|
| 2,076,446 | A | * | 4/1937 | Carwardine ................... 248/585 |
| 2,090,439 | A | * | 8/1937 | Carwardine ................... 248/160 |

(Continued)

FOREIGN PATENT DOCUMENTS

| | | |
|---|---|---|
| EP | 0192253 | 8/1986 |
| EP | 429008 | 5/1991 |

(Continued)

OTHER PUBLICATIONS

Extended European Search Report dated Feb. 9, 2012 for European Patent Application No. 09818373.4.

(Continued)

*Primary Examiner* — Joshua Kennedy
(74) *Attorney, Agent, or Firm* — Schnader Harrison Segal & Lewis LLP

(57) ABSTRACT

A support arm having a proximate support arm segment, a distal support arm segment, and a hinge system having a proximate end pivotally connected to the proximate support arm segment at a proximate pivot, and a distal end pivotally connected to the distal support arm segment at a distal pivot. A tensile member having a first end and a second end, has the first end extending into and secured at a termination point on or beyond either the proximate support arm segment or the distal support arm segment, and the second end extending into and secured at a termination point on or beyond either the proximate support arm segment or the distal support arm segment. The tensile member thereby biases one or both of the proximate support arm segment and the distal support arm segment with respect to the hinge system.

25 Claims, 28 Drawing Sheets

(56) References Cited

U.S. PATENT DOCUMENTS

| | | | |
|---|---|---|---|
| 3,774,873 | A | 11/1973 | Krogsrud |
| 4,083,480 | A | 4/1978 | Lee et al. |
| 4,131,378 | A * | 12/1978 | Daws ............................ 403/93 |
| 4,156,512 | A | 5/1979 | Brown |
| 4,208,028 | A * | 6/1980 | Brown et al. ................. 224/185 |
| 4,393,541 | A * | 7/1983 | Hujsak et al. ................... 16/297 |
| 4,394,075 | A | 7/1983 | Brown et al. |
| 4,437,753 | A | 3/1984 | Dunn |
| RE32,213 | E | 7/1986 | Brown |
| 4,682,749 | A * | 7/1987 | Strater ....................... 248/284.1 |
| 4,695,024 | A * | 9/1987 | Haven ...................... 248/281.11 |
| 5,243,370 | A | 9/1993 | Slater |
| 5,339,233 | A * | 8/1994 | Yang ............................. 362/402 |
| 5,360,196 | A | 11/1994 | Di Giulio et al. |
| 5,402,690 | A | 4/1995 | Sekiguchi et al. |
| 5,435,515 | A | 7/1995 | Di Giulio et al. |
| 5,538,214 | A * | 7/1996 | Sinila ......................... 248/278.1 |
| 6,030,130 | A | 2/2000 | Paddock et al. |
| 6,168,341 | B1 * | 1/2001 | Chene et al. .................... 403/76 |
| 6,378,829 | B1 * | 4/2002 | Strater et al. ............... 248/276.1 |
| 6,889,404 | B2 * | 5/2005 | Lu et al. .......................... 16/287 |
| 6,896,230 | B2 | 5/2005 | Cvek |
| 7,003,851 | B2 * | 2/2006 | Salice ............................. 16/285 |
| 7,055,789 | B2 | 6/2006 | Libbey |
| 7,299,523 | B2 * | 11/2007 | Zou ................................ 16/287 |
| 7,562,851 | B2 * | 7/2009 | Hein et al. ............... 248/281.11 |
| 2006/0186281 | A1 | 8/2006 | Thiessen |
| 2006/0231700 | A1 | 10/2006 | Orf et al. |
| 2006/0258495 | A1 * | 11/2006 | Hein et al. ...................... 474/82 |
| 2006/0262274 | A1 | 11/2006 | Brown et al. |
| 2006/0263082 | A1 | 11/2006 | Brown |
| 2007/0080275 | A1 | 4/2007 | Stachowski et al. |
| 2007/0237572 | A1 | 10/2007 | Thiessen |
| 2013/0016492 | A1 * | 1/2013 | Wang et al. ................... 361/820 |

FOREIGN PATENT DOCUMENTS

| | | |
|---|---|---|
| EP | 1312251 | 5/2003 |
| EP | 1726412 A1 | 11/2006 |
| GB | 2325393 | 11/1998 |
| WO | 0016950 | 3/2000 |
| WO | 03046431 A1 | 6/2003 |
| WO | 2008/112687 | 9/2008 |
| WO | 2009/087299 | 7/2009 |
| WO | 2011/155934 | 12/2011 |

OTHER PUBLICATIONS

International Search Report and Written Opinion dated Jan. 26, 2010 for PCT Patent Application No. PCT/US2009/058783.
International Preliminary Report on Patentability dated Aug. 16, 2010 for PCT Patent Application No. PCT/US2009/058783.
Jul. 31, 2012—Office Action from U.S. Appl. No. 12/530,023.
Extended European Search Report dated Mar. 30, 2011 for European Patent Application No. 08731892.9.
Patent Examination Report No. 1 for AU App. No. 2009298701 dated Jun. 17, 2013.
First Notification of Examiner's Opinion for CN App. No. 200980138197.2 dated Nov. 5, 2012.
First Office Action for JP App. No. 2011-529348 dated Aug. 6, 2013.
International Search Report and Written Opinion for PCT/US2008/056511 dated Jul. 16, 2008.

* cited by examiner

FIG. 26
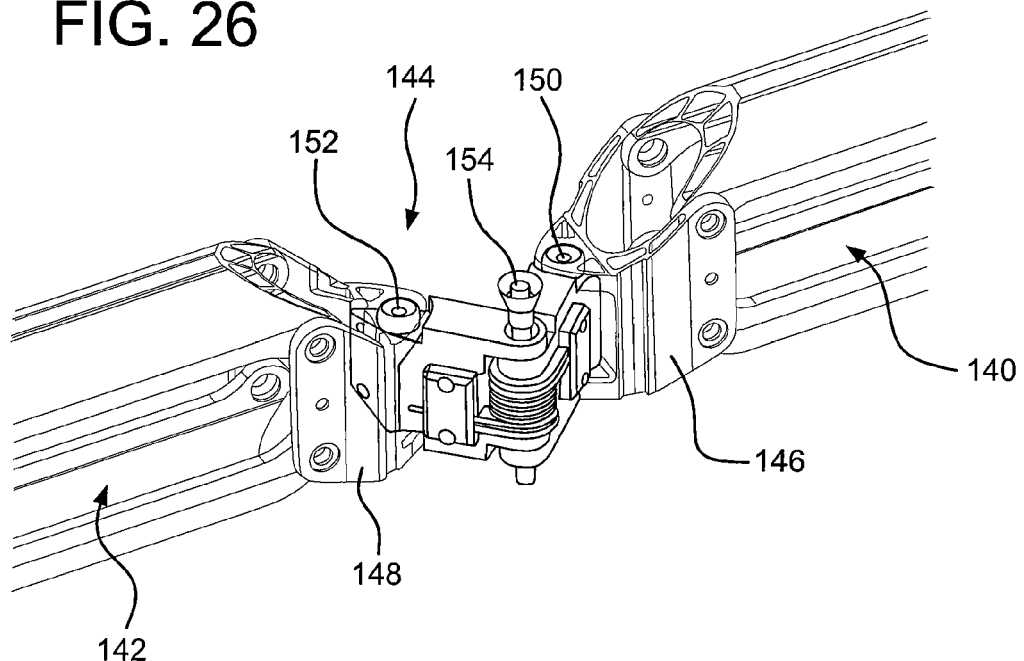
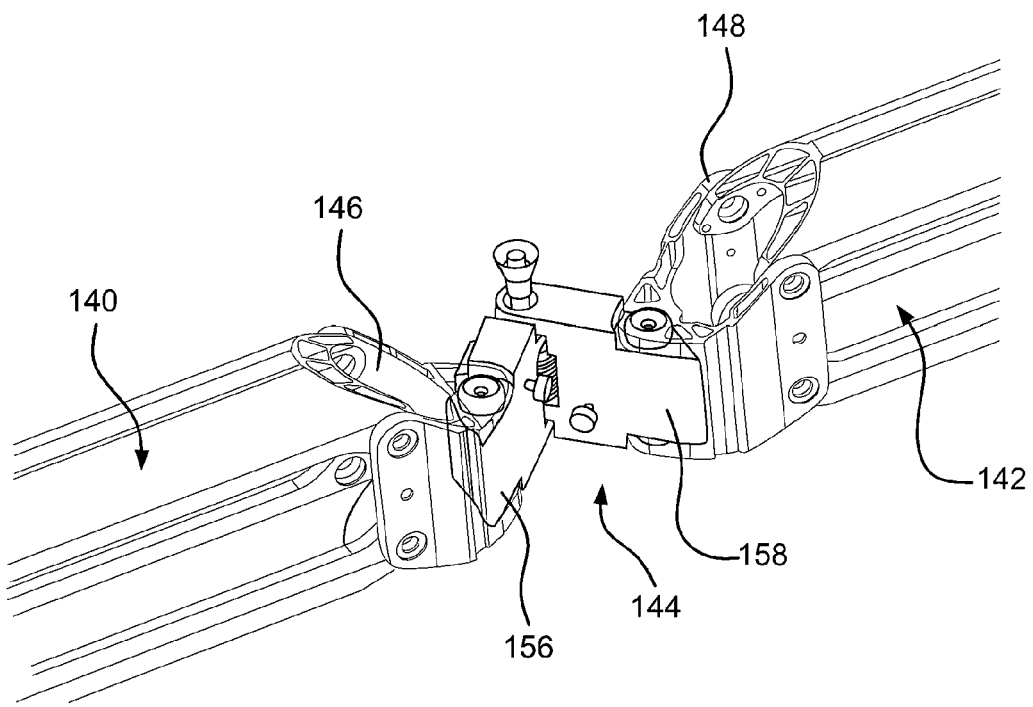
FIG. 27

BIASED HINGE FOR EQUIPOISING SUPPORT EQUIPMENT

This application is based on, and claims priority to, U.S. provisional application 61/101,406, filed Sep. 30, 2008, and entitled, Biased Hinge for Equipoising Support Equipment. This application is a continuation-in-part of pending U.S. application Ser. No. 12/530,023, filed Sep. 4, 2009, and entitled Biased Hinge for Equipoising Support Equipment, which is based on and claims priority to U.S. provisional application 60/894,571, filed Mar. 13, 2007, and U.S. provisional application 61/019,350, filed Jan. 7, 2008, both entitled Biased Hinge for Equipoising Support Equipment; and which is a national phase application of PCT application PCT/US2008/056511, having an international filing date of Mar. 11, 2008, and entitled Biased Hinge for Equipoising Support Equipment.

BACKGROUND OF THE INVENTION

Stabilizing equipment support devices have been employed for many years in the motion picture and video industry, and in industrial environments to support cameras, tools and other equipment while in use. Examples of such devices include support arms that rely on a pair of spring-powered parallelogram arm sections to isolate and support the equipment. The supports often include a gimbal device to isolate the equipment from the arm motion. Increasingly sophisticated spring-loaded parallelogram arm segments that are interconnected by hinges acting around vertical axes have been designed. Similar hinges may also interconnect the support arms to the operator's semi-rigid harness. These support arms may permit an operator to position extremely heavy payloads in space with minimal force and move them anywhere within reach of his or her own arms with fingertip precision.

Problems arise, however, when the sum of the hinge tolerances and the various parallelogram link bearing tolerances combine to permit the arm to increasingly 'sag' (as its hinge pins—spaced from the mount out to the payload—progressively depart from vertical) such as when a camera is held out further and further away from the operator. Close tolerances and rigid materials have become essential in the construction of these arms, but some 'sag' is inevitable, and operators have learned to compensate by slightly leaning back away from the camera during these arm extensions, to bias the camera payload so that it stays in place and does not continue to fall away.

'Hard-mounted' applications have occasionally been employed. A 'hard-mounted' arm is mounted directly to a fixed support, such as a portion of a camera car or camera dolly, so that the operator does not have to bear the load of the equipment, yet still provide the stabilizing effect of the gimbal mount and arm suspension to tune out the bumps as the vehicle progresses.

In these cases, current designs provide no remedy for 'sag' as the arm extends and the operator is required to continually hold back the payload with his or her other hand. This has been a serviceable arrangement for camera work, but will be a more significant problem for other applications of the stabilizing equipment. These arms are also used to reduce workplace fatigue and injuries caused by the repetitive lifting and deploying of heavy tools and equipment for industrial applications. These applications are 'hard-mounted' in most cases, and therefore a means is required to assist in the natural 'centering' of these arms so that they do not tend to fall away from the ideal location of use, if inadvertently displaced either inwardly or outwardly. Industrial users for example, often do not have a free hand to assist in keeping the payload where it is needed laterally, and so a means is required to perform that function.

SUMMARY OF THE INVENTION

Embodiments of the invention generally relate to support arms having a proximate support arm segment, a distal support arm segment, and a hinge system having a proximate end pivotally connected to the proximate support arm segment at a proximate pivot, and a distal end pivotally connected to the distal support arm segment at a distal pivot. The support arms have a tensile member with a first end and a second end, with the first end extending into and secured at a termination point on or beyond either the proximate support arm segment or the distal support arm segment, and the second end extending into and secured at a termination point on or beyond either the proximate support arm segment or the distal support arm segment. The tensile member thereby biases one or both of the proximate support arm segment and the distal support arm segment with respect to the hinge system.

In an exemplary embodiment of the invention, the support arm has an axle disposed substantially parallel to, and in an area between, the proximate pivot and the distal pivot, and the tensile member is disposed at least partially around the axle. For many applications, this axle is preferably rotatable.

The tensile member may have its ends terminate at various placed on the support arm or hinge assembly. Illustrative configurations include:

- the tensile member first end extending into the proximate support arm segment and secured at a termination point on or beyond the proximate support arm segment, and the tensile member second end extending into the distal support arm segment and secured at a termination point on or beyond the distal support arm segment;
- the tensile member first end secured at a termination point on the proximate support arm segment, and the tensile member second end secured at a termination point on the distal support arm segment;
- the tensile member first end and the tensile member second end secured at termination points on or beyond the same support arm segment;
- the tensile member first end is secured at a termination point on a shoulder hinge, wherein the shoulder hinge is pivotally attached to the proximate support arm segment at an end opposite to the proximate pivot;
- the tensile member first end and the tensile member second end secured at termination points on a shoulder hinge, wherein the shoulder hinge is pivotally attached to the proximate support arm segment at an end opposite to the proximate pivot;
- the tensile member second end secured at a termination point on a base connection component, wherein the base connection component is pivotally attached to the distal support arm segment at an end opposite to the distal pivot;
- the tensile member first end and the tensile member second end secured at termination points on a base connection component, wherein the base connection component is pivotally attached to the distal support arm segment at an end opposite to the distal pivot.

The tensile member may be resilient or non-resilient. There may be one or more tensile members, and each may have different characteristics, such as resiliency, length, material, thickness, etc. The tensile members can follow various paths, include parallel to the longitudinal span of support arm segments or at various angles threreto. The paths of various tensile members within a support arm may be the same or different. Tensile members can be on the same side of a support arm or on different sides.

In illustrative embodiments of the invention, the support arm includes rotational limit stops. In an exemplary embodiment of the invention, the rotation limit stop includes, a first stop component, a second stop component slidable with respect to the first stop component, the first stop component secured to the hinge system so the second stop component is slidable to and away from a contact point on one of the proximate support arm segment or the distal support arm segment, wherein when the second stop component encounters the contact point, the angular motion of the arm segment with respect to the hinge system is at a maximum. The first stop component may be hollow, for example, and the second stop component slidable therein.

The invention also includes a support arm having a hinge system with a hinge body with a proximate end pivotally connected to the proximate support arm segment at a proximate pivot, a distal end pivotally connected to the distal support arm segment at a distal pivot, and an axle disposed substantially parallel to, and in an area between, the proximate pivot and the distal pivot, and a proximate torsion spring disposed around the proximate pivot positioned. A first end of the proximate torsion spring is in contact with the axle and a second end of the proximate torsion spring is in contact with the proximate support segment, thus biasing the range of motion of the proximate support arm segment with respect to the hinge body.

The hinge may also have a distal torsion spring disposed around the distal pivot positioned, wherein a first end of the distal torsion spring is in contact with the axle and a second end of the distal torsion spring is in contact with the distal support segment, thus biasing the range of motion of the distal support arm segment with respect to the hinge body.

In another illustrative embodiment of the invention, the support arm has a proximate support arm segment, a distal support arm segment, a hinge assembly having a proximate hinge segment and distal hinge segment, the proximate hinge segment pivotally connected to the distal hinge segment at a friction clutch pivot, the friction clutch pivot being a part of a friction clutch assembly. The proximate hinge segment is rigidly connected to the proximate support arm segment at a proximate pivot at an end of the proximate hinge segment opposed to the friction clutch pivot. The distal hinge segment is rigidly connected to the distal support arm segment at a distal pivot at an end of the distal hinge segment opposed to the friction clutch pivot.

In an exemplary embodiment of the invention the friction clutch assembly has a hinge pin, a friction clutch drum disposed circumferentially around at least a portion of the hinge pin, a torsion spring disposed around the friction clutch drum, and a retainer to secure a first end of the torsion spring to the proximate hinge segment and a second end of the torsion spring to the distal hinge segment, thereby providing rotational forces on the proximate and distal hinge segments. A friction clutch band is disposed around the friction clutch drum and is capable of applying a force to the friction clutch drum. A friction clutch adjustment device can be functionally incorporated into the friction clutch assembly to adjust the force of the friction clutch band on the friction drum.

In an illustrative embodiment of the invention, the friction clutch adjustment device includes a force component configured to exert a force on the friction clutch band in the direction of the friction drum so as to vary the force of the friction clutch band on the friction drum upon movement of the force component. The force component may be, for example, a screw disposed into a threaded bore in the hinge assembly so as to vary the force of the friction clutch band on the friction drum upon movement of the screw in or out of the hinge assembly.

In an exemplary embodiment of the invention, the friction clutch adjustment device can adjust the force required to rotate the proximate hinge section and the distal hinge section about the friction clutch pivot in a range from where the hinge sections are freely movable to where they are substantially immovable.

In a further illustrative embodiment of the invention, the arm segments may be attached to the hinge segments by a barrel assembly. The assembly may be configured to be easily reversed from left to right. The barrel assembly may include a first mounting barrel and a second mounting barrel longitudinally disposed with one another. A first locking screw and a second locking screw are longitudinally disposed with one another, and longitudinally disposed within the first mounting barrel and the second mounting barrel. The locking screws can be driven longitudinally toward or away from one another thereby compressing or separating the mounting barrels. At least one of the first and second mounting barrels may have an extension spring disposed at an end open end of that mounting barrel. When the first and second mounting barrels are compressed toward one another, the mounting barrel assembly can be slidably removed from the hinge assembly and support arm segment, thereby disconnecting the hinge assembly from the support arm segment.

Embodiments of the invention include the mounting barrel assembly, hinges that include the mounting barrel assembly and support arms that include the mounting barrel assembly.

Illustrative embodiments of the invention also include methods of supporting objects utilizing any of the support arms, hinges or components described herein. The methods may include, for example, some or all of the following steps:

attaching an object to a support arm;

adjusting a hinge system in a support arm to bias the support arm to a selected position or range of positions;

adjusting a rotation limit stop to limit the extent of angular motion of the proximate support arm segment, the distal support arm segment or both, with respect to the hinge system;

biasing the range of motion of the proximate support arm segment and the distal support arm segment with respect to the hinge body; and adjusting a friction clutch assembly to bias the support arm to a selected position or range of positions.

DESCRIPTION OF THE DRAWINGS

The invention is best understood from the following detailed description when read in conjunction with the accompanying drawings.

FIG. 26 depicts a side view of a hinge having a friction clutch assembly according to an illustrative embodiment of the invention.

FIG. 27 depicts a side view of a hinge having a friction clutch assembly opposite to the view in FIG. 26 according to an illustrative embodiment of the invention.

DETAILED DESCRIPTION OF THE INVENTION

Figure 1:
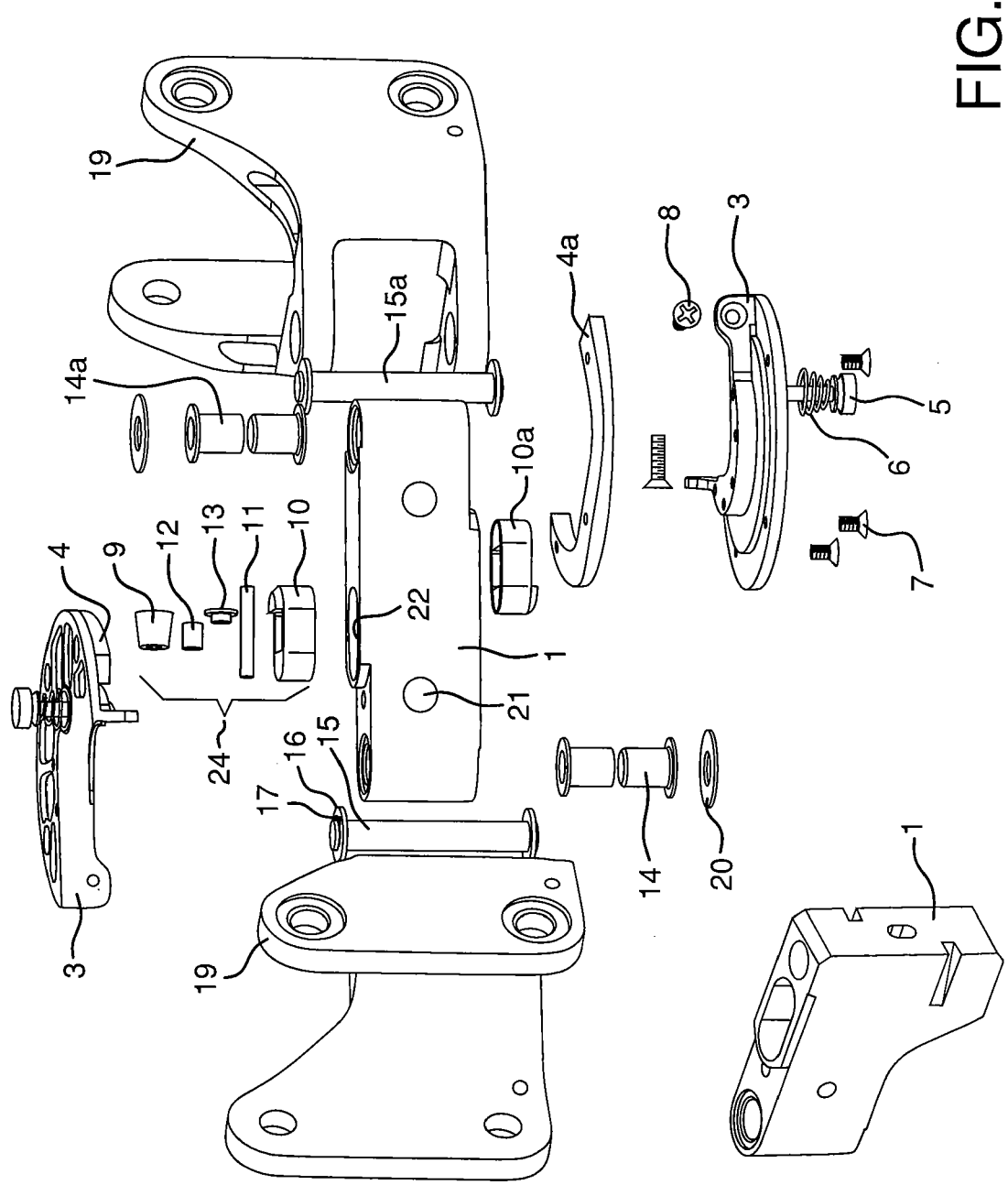
FIG. 1 is an exploded assembly diagram of a double-ended centering hinge according to an illustrative embodiment of the invention.

FIG. 1 shows an exploded assembly diagram of a double-axle, centering-hinge according to an illustrative embodiment of the invention. Hinge link 1 pivots between left and right hand end blocks 19 on pins 15 and 15a. Cam roller assembly 24 (comprising cam roller 9, roller block 10, axle 11, sleeve bearing 12, and flange bearing 13) is inserted in well 22 and arcuate cam plate 4 is attached to cam mounting plate 3, which is connected to end block 19. Cam plate 4 is thus in contact with cam roller 9 and as the hinge deploys angularly around pin 15, the hills and valleys on cam plate 4 ride up and down on cam roller 9 and cause end block 19 to correspondingly rise and fall. Flanged bearings 14 and 14a, preferably Teflon® serve to reduce friction and permit the end blocks to be easily displaced vertically on pin 15 by the cam action as the hinge swings around the end block. In this embodiment, the payload of the equipoising support arm is transferred by end block 19 through cam plate 4, which is in contact with roller 9. The weight is thus supported by hinge link 1 and in turn a second cam roller (not shown within roller block 10a) on the underside of hinge 1 rests on cam plate 4a, which likewise causes hinge 1 to rise and fall as the hinge angle relative to end block 19 is varied. This arrangement has the virtue of providing cam induced biasing action, which can be substantially proportional to the weight born by the support apparatus, and which seeks the 'valleys' in the cam plate.

Figure 2:
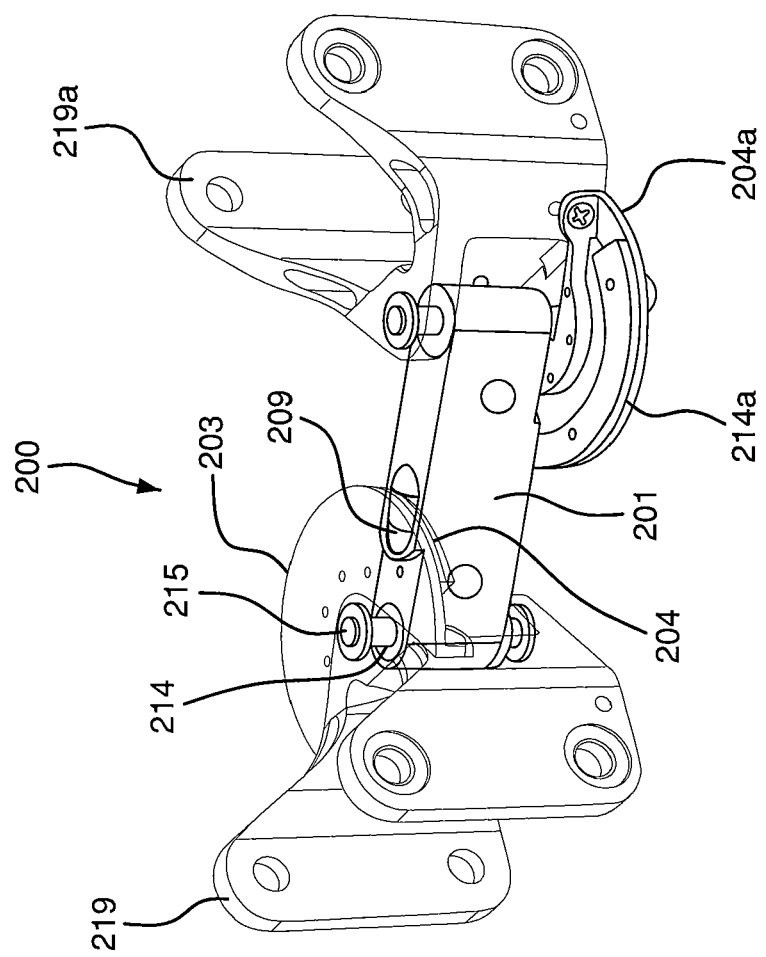
FIG. 2 is an assembled double-acting hinge transparently showing cam-driven centering components at both ends according to an illustrative embodiment of the invention.

FIG. 2 shows double-acting hinge assembly 200, transparently showing cam-driven centering components at both ends according to an illustrative embodiment of the invention. Cam mounting plate 203 is attached to end block 219. As hinge 201 swings around pin 215, cam plate 204 (hidden beneath cam mounting plate 203) rides on cam roller 209 so that the cam plate's hills and valleys cause end block 219 to rise and fall, causing pin 215 to be displaced vertically within flange bearings 214. Gravity, therefore will tend to bias cam plate 204 against roller 209 and impel hinge 201 to seek the thinner 'valleys' versus the thicker 'hills' of the cam. Therefore, depending on the designed position of valleys and hills along the arcuate cam plate, the support arm segments (not shown) can be biased to desired angular orientations relative to hinge 201.

End block 219a and the analogous cam components on the underside of hinge 201, such as cam plate 204a and flange bearings 214a as shown, can likewise be biased to complementary positions so that the orientation of the support arm segments (not show) will tend to maintain the payload in the desired location.

Figure 3:
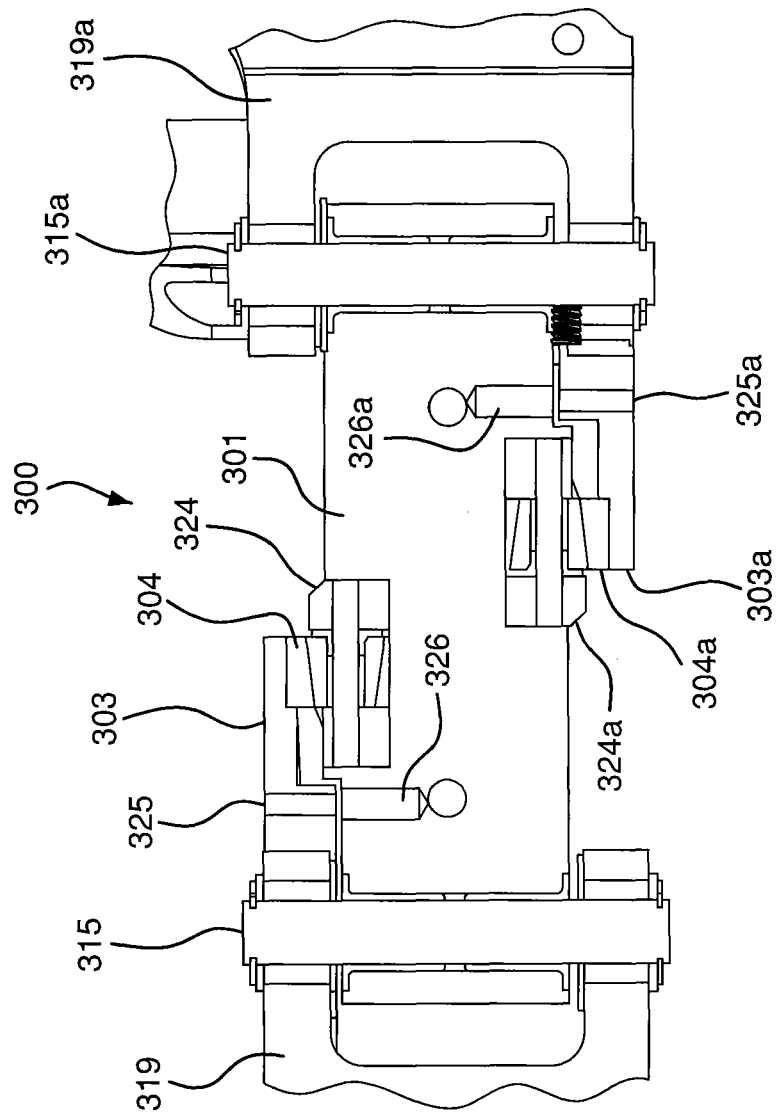
FIG. 3 is a side cut-away view of a double-acting, self-centering hinge assembly according to an illustrative embodiment of the invention.

FIG. 3 is a cut-away side view of double-acting, self-centering hinge assembly 300 according to an illustrative embodiment of the invention. Hinge 301 pivotably interconnects end blocks 319 and 319a by pins 315 and 315a. Cam roller assemblies 324 and 324a are preferably imbedded in respective wells in hinge 301. Cam mounting plates 303 and 303a are attached to end blocks 319 and 319a, respectively, and support interchangeable arcuate cam plates 304 and 304a. The interaction of cam rollers and selectively sculpted hills and valleys on the cam plates tends to bias the relative end block to hinge orientations that facilitate the deployment of the support arm payload (not shown). The cam and cam roller interaction can be based primarily on gravity or the two components can be forcibly in contact with one another. A spring loaded, threaded locking pin (not shown in FIG. 3, but an example of which is shown as locking pin 427 in FIG. 4.), can be inserted in a selected hole, among a selection of holes such as 325 or 325a to engage locking pin 326 or 326a in hinge 301 in order to angularly immobilize either side of the double-acting hinge, to prevent compound relative motion and cause simple pivotable motion between the opposite end block and hinge 301. Both sides can also be immobilized if desired.

Figure 4:
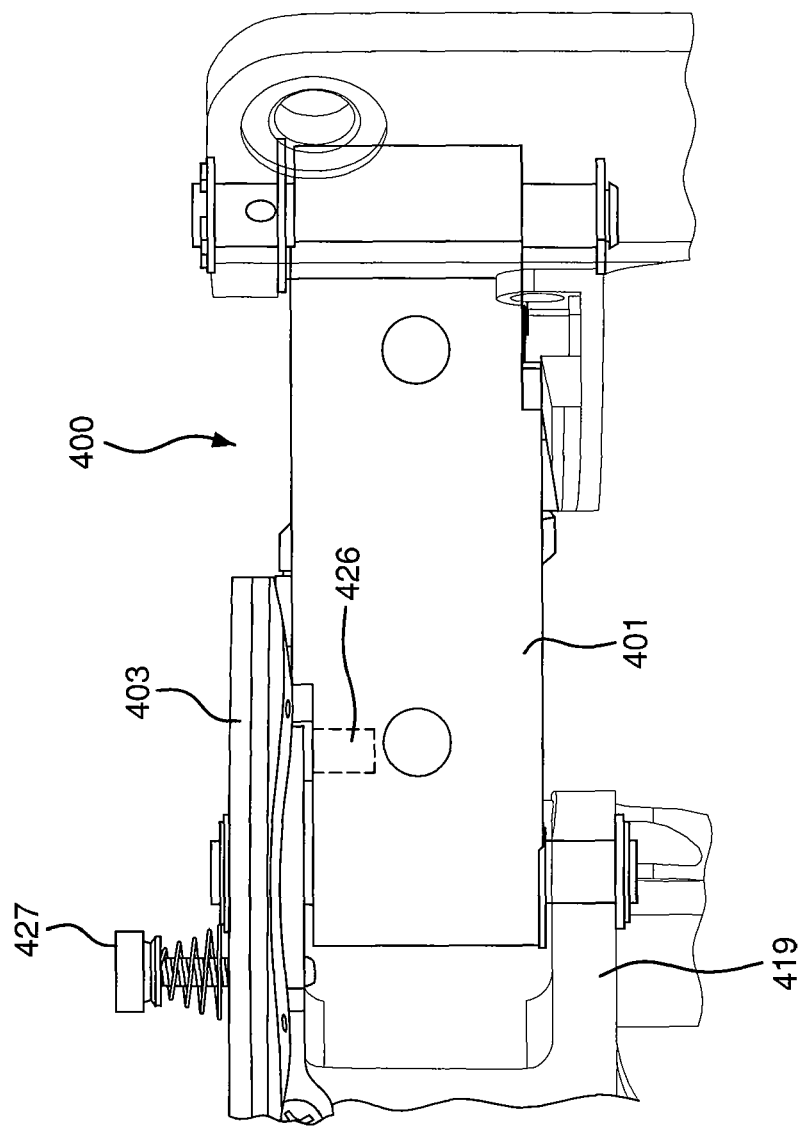
FIG. 4 is a side view showing a spring-loaded threaded locking pin to immobilize either end of a double-acting centering hinge according to an illustrative embodiment of the invention.

FIG. 4 is a partial side view of biasing hinge assembly 400, showing a spring-loaded threaded locking pin to immobilize either end of a double-acting biasing hinge according to an illustrative embodiment of the invention. Locking pin 427 is inserted in one of a series of holes (only one of which is shown) in cam mounting plate 403, so that when the locking hole 426 in hinge 401 lines up with locking pin 427 the relative angular positions of end block 419 and hinge 401 can be fixed. Preferably the series of holes are disposed in an arced configuration.

Figure 5:
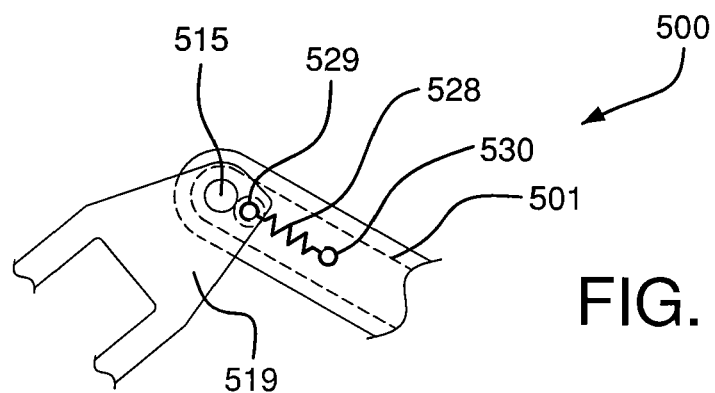
FIG. 5 is a diagrammatic top view of another illustrative embodiment of the invention using a resilient means to bias the centering hinge to the selected angular position.

FIG. 5 is a diagrammatic top view of a hinge mechanism 500 according to an illustrative embodiment of the invention, which employs resilient means 528 to bias centering hinge 501 to a selected position. Hinge 501 pivots about pin 515. Offset pivot pin 529 is connected to hinge pivot pin 530 by resilient means 528. Hinge 501 is shown in the position that roughly yields the shortest distance between pins 529 and 530, which, in the absence of opposing forces, will be the default position of hinge 501 relative to end block 519.

Figure 6:
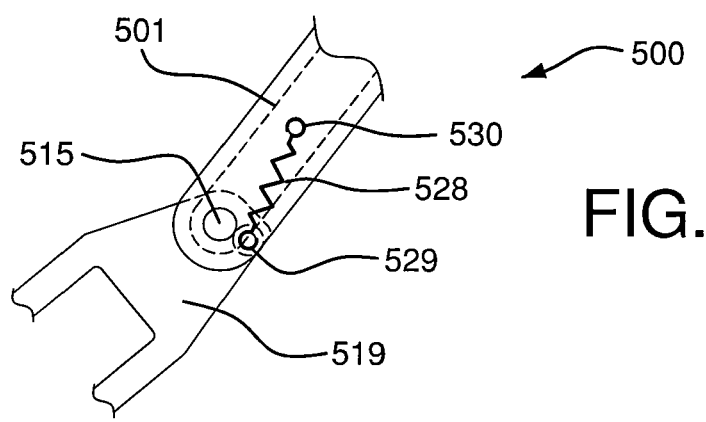
FIG. 6 is a diagrammatic top view of the FIG. 5 embodiment showing the hinge forced into an angular position that further stretches the resilient means.

FIG. 6 is a diagrammatic top view of hinge mechanism 500 according to a further illustrative embodiment of the invention, showing a hinge 501 forced into an angular position that further stretches resilient means 528.

Figure 7:
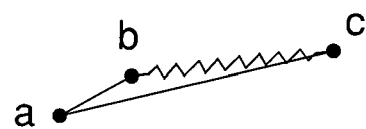
FIG. 7 shows a diagrammatic view of a force-exerting triangle as the hinge deploys straight out as in FIG. 6.
Figure 8:
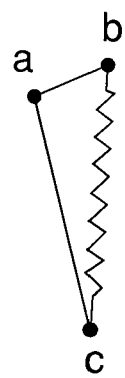
FIG. 8 depicts a diagrammatic view of a force-exerting triangle as the hinge deploys off to one side as in FIG. 5, according to an illustrative embodiment of the invention.

FIG. 7 and FIG. 8 show diagrammatic views of two illustrative force-exerting triangles as the hinge deploys straight out, as in FIG. 6. FIG. 8 depicts a force triangle as the hinge is off to one side, as in FIG. 5. Note that distance bc in FIG. 7 is clearly shorter than distance bc in FIG. 8. This explains how the resilient means of this embodiment of the present invention can be used to bias the hinge of FIG. 5 to the position shown.

Figure 9:
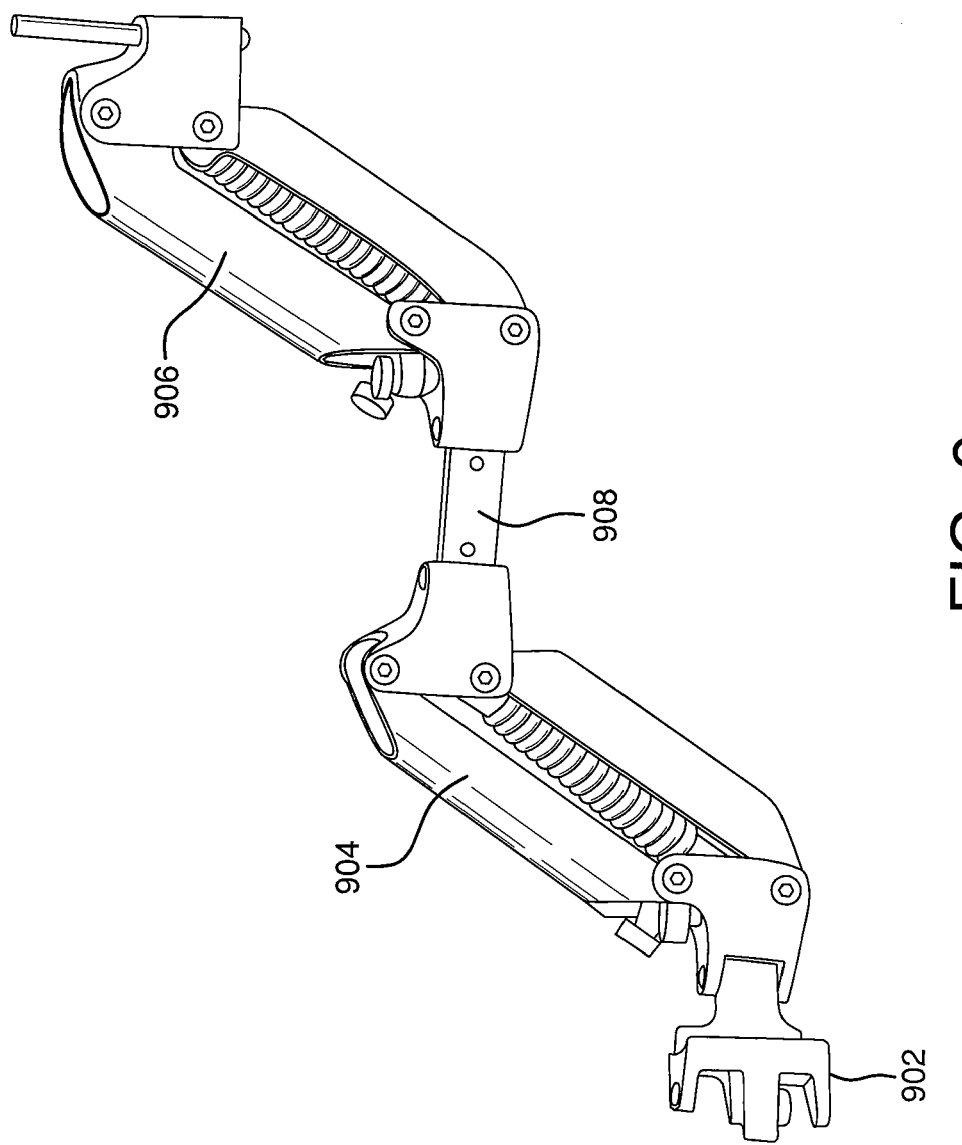
FIG. 9 is an illustrative support arm that can be used with an inventive hinge according to an illustrative embodiment of the invention.

FIG. 9 depicts an illustrative support arm that can be used with an inventive hinge. The hinge can link the support arm to a base for example at location 902. It can also join the two arm segments 904, 906 at junction 908.

Figure 10:
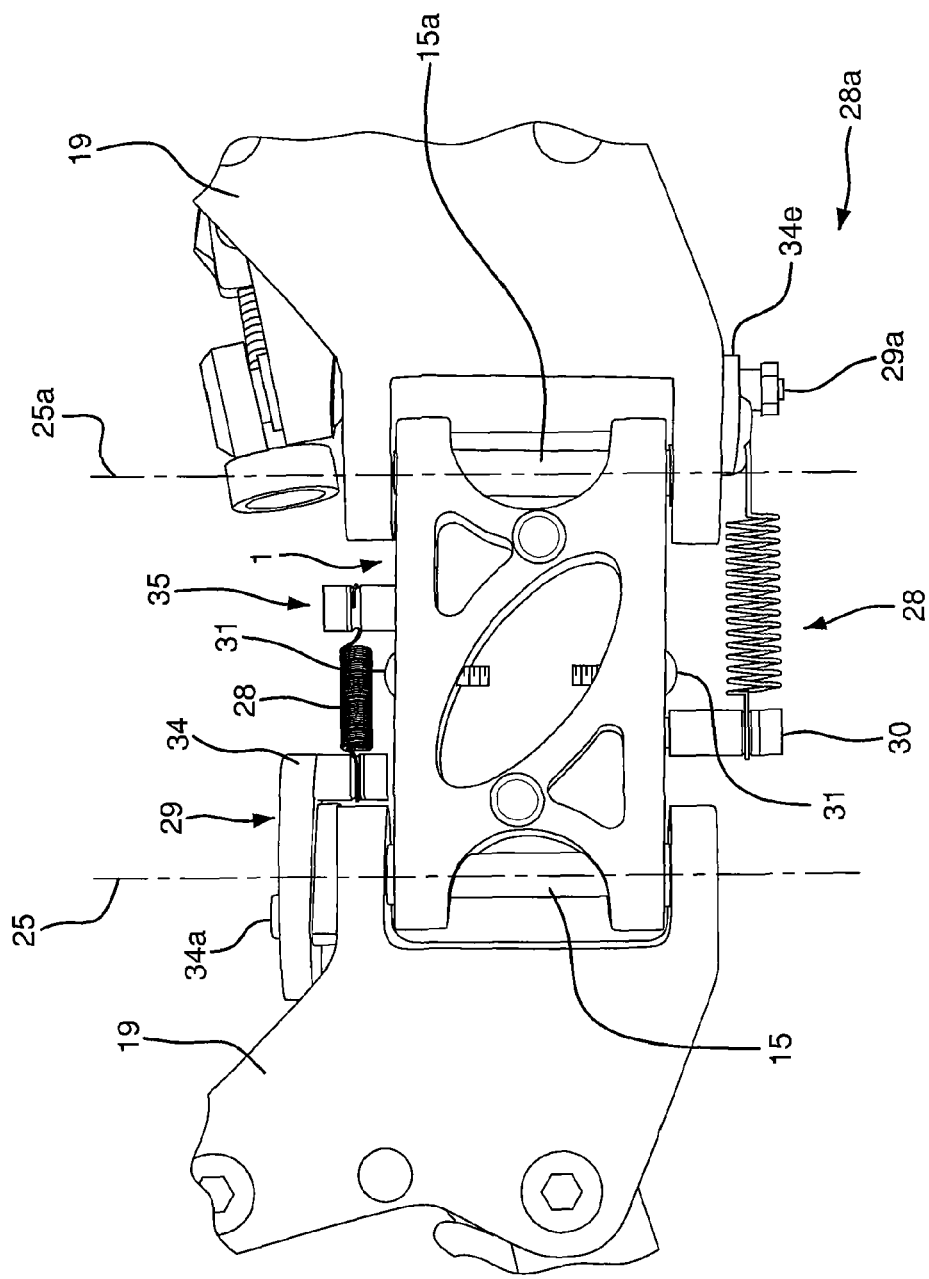
FIG. 10 is a side elevation of a hinge interconnecting two arm segments illustrating two different resilient-means attachment geometries according to an illustrative embodiment of the invention.

FIG. 10 is a side elevation of hinge 1 interconnecting two arm segments (not completely shown) by means of two different resilient-means attachment geometries. End blocks 19 are attached to parallelogram support arm segments (not shown) and are interconnected to hinge 1 by means of hinge pins 15, 15a so that arm segments pivot respectively on hinge pivot centerlines 25, 25a. Spring termination disc 34 is attached to end block 19 by locking screws 34a and mounts offset spring attachment axle 29 on the hinge-side of pivot centerline 25 so that spring attachment axle 29 changes distance from hinge-mounted spring attachment axle 35 as end block 19 rotates relative to hinge 1. As shown, resilient means 28, here illustrated as a spring with extended attachment hook 28a, serves to bias end block 19 to seek the orientation that provides the shortest spring length—as shown with end block 19 lined up with hinge 1. Beneath hinge 1, axle 29a over-centers offset spring attachment on the opposite side of pivot line 25a (away from the hinge) and therefore spring 28, attached to hinge 1 by means of axle 30 will tend to bias end block 19 to seek orientations 90 degrees to either side of hinge 1. The combination of these two spring attachment geometries biases end blocks 19 to a 90 degree relative orientation, which can forcibly be re-oriented to be stable on either side— for 'right-handed' or left-handed' payload supported operations.

Figure 11:
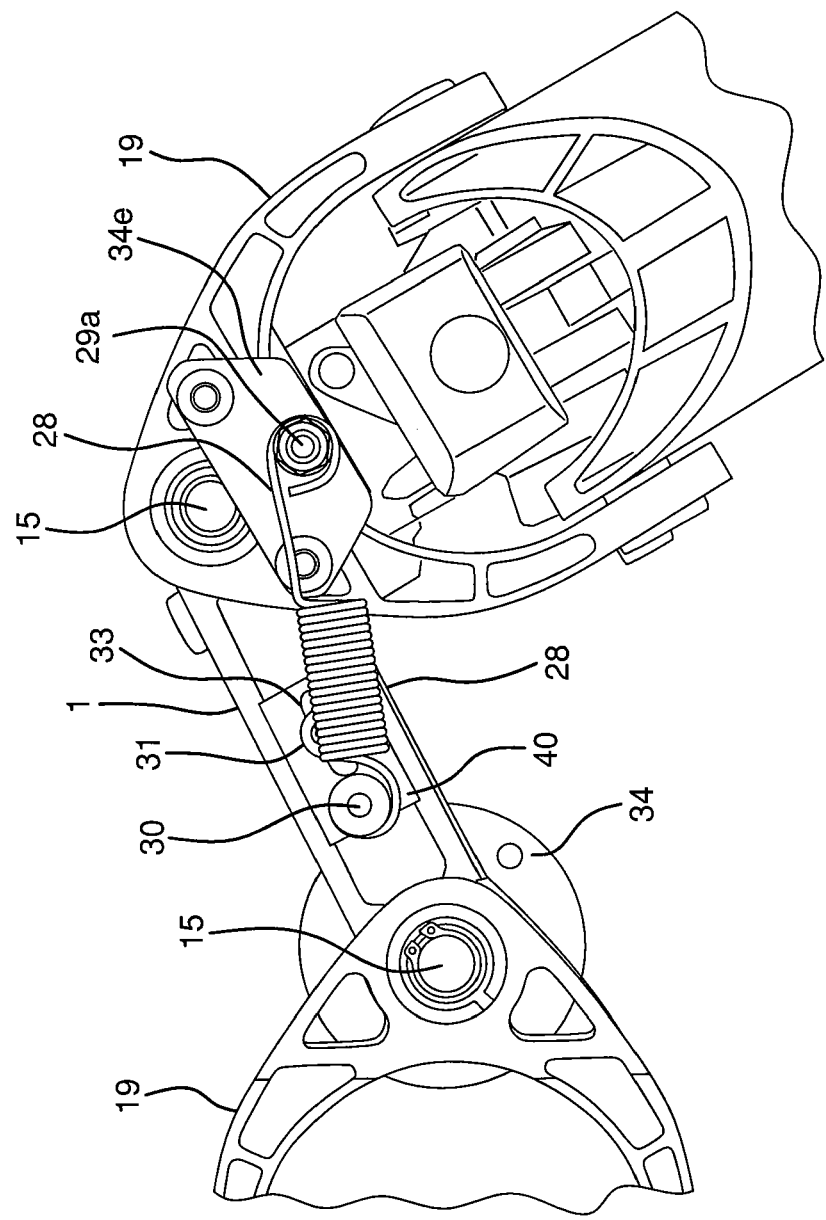
FIG. 11 is a view of the underside of the hinge assembly of FIG. 10 detailing the 'over-centers' resilient-means attachment geometry according to an illustrative embodiment of the invention.

FIG. 11 is a detail of the underside of hinge 1 as illustrated in FIG. 10 showing the 'over-centers' resilient-means attachment geometry according to an illustrative embodiment of the invention. Overcenters attachment axle 29a, mounted on mounting plate 34e attached to end block 19 is displaced toward end block 19 from hinge pin centerline 25a (see FIG. 10), and is thus offset away from hinge 1. Resilient means 28 (shown here as a spring) operatively connects hinge-mounted axle 30 with over-centers axle 29a and thus biases end block 19 and its attached parallelogram support arm (not shown) to orientations that are 90 degrees on either side of the centerline of hinge 1. A tension adjusting mechanism can also be provided, such as spring tension plate 40. A spring tension adjusting plate slide 40 within a recess in the top of hinge 1 by means of slot 33 and locking screw 31 to provide a range of spring tensions to bias the various degrees of arm 'sag' caused by payloads of differing weight.

FIGS. 10 and 11 show the hinge apparatus with the second end block attached to a second end of the hinge body and pivotal therewith around a second axis. These figures depict a second biasing component having a second resilient member with a first end and a second end, a second end block termination point on the second end block and a second hinge body termination point on the hinge body on a side opposite to the first hinge body termination point with respect to top and bottom. The second end block termination point and the second hinge block termination point are on the same side of the hinge apparatus with respect to top and bottom. The second end block termination point is located further from the first hinge body termination point than the second axis as measured when the second end block and the hinge body are positioned 180° to one another. The distance between the second end block termination point and the second hinge body termination point decreases as the second end block is rotated with respect to the hinge body around the second axis as the apparatus is adjusted away from a position in which the hinge body and the second end block are at 180° to one another. The second resilient member first end is attached to the hinge body at the second hinge body termination point and the second resilient member second end is attached to the second end block at the second end block termination point, thereby biasing the position of the second end block with respect to the hinge body to a position wherein the second resilient member tension is minimized. In a preferred embodiment of the invention, the distance between the second end block termination point and the first hinge body termination point increases as the first end block is rotated with respect to the hinge body around the first axis a position in which the hinge body and the first end block are at 180° to one another.

Figure 12:
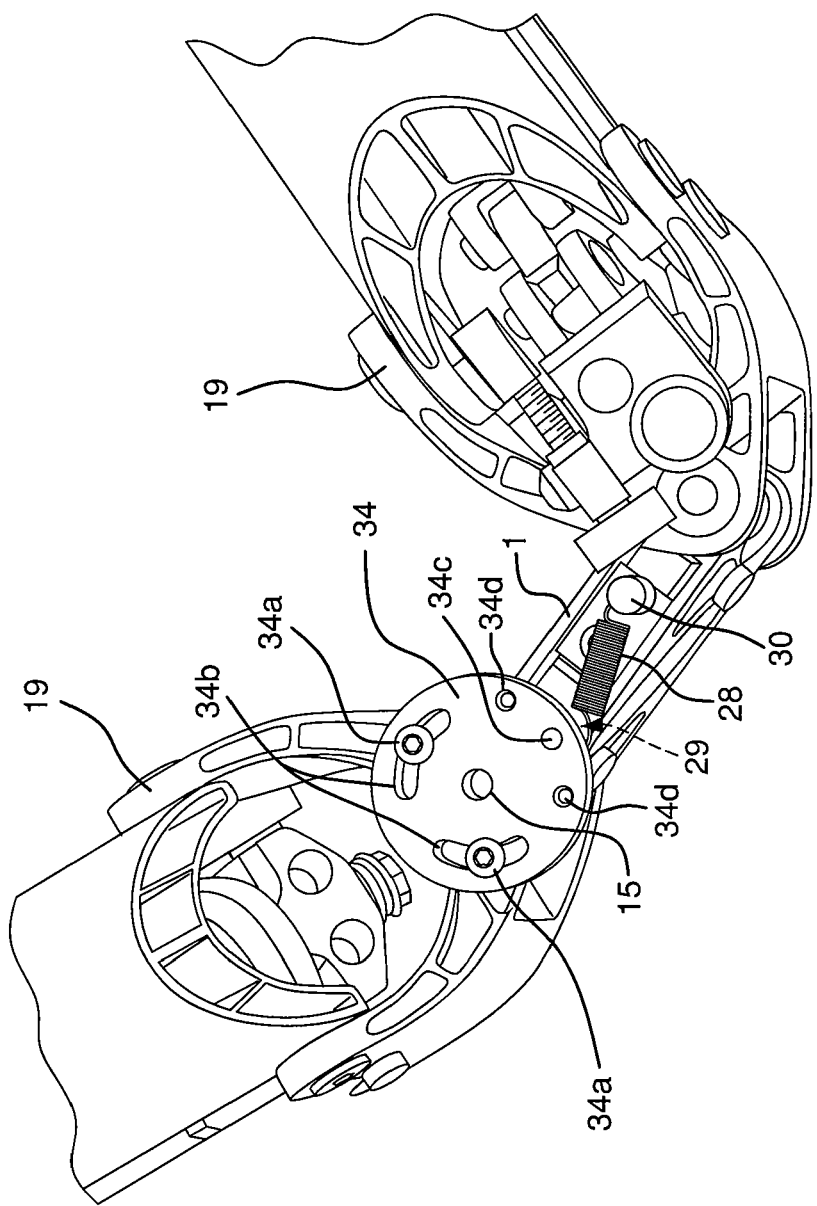
FIG. 12 is a top elevation showing a spring termination adjusting disc and selected spring position.

FIG. 12 is a top elevation showing spring termination adjusting disc 34 and selectable spring axle positions 34d, according to an illustrative embodiment of the invention. Spring 28 resiliently connects hinge-mounted offset spring axle 30 with offset axle 29 mounted on disc 34 at selected location 34c, (positionally adjusted by means of slots 34a and locking screws 34b), in order to bias end block 19 in a substantially straight line orientation with respect to hinge 1 in an illustrative embodiment of the invention. FIG. 12 shows the selectable spring axle positions 34d being disposed in an arc around spring termination disc 34. It is noted that other geometries of selectable positions are within the spirit and scope of the invention and can provide different biasing configurations. Further, although the termination disc is shown with hinge pin 15 in the center of the termination disc, it can be offset, to create desired biasing effects and variations in spring tensions.

Figure 13:
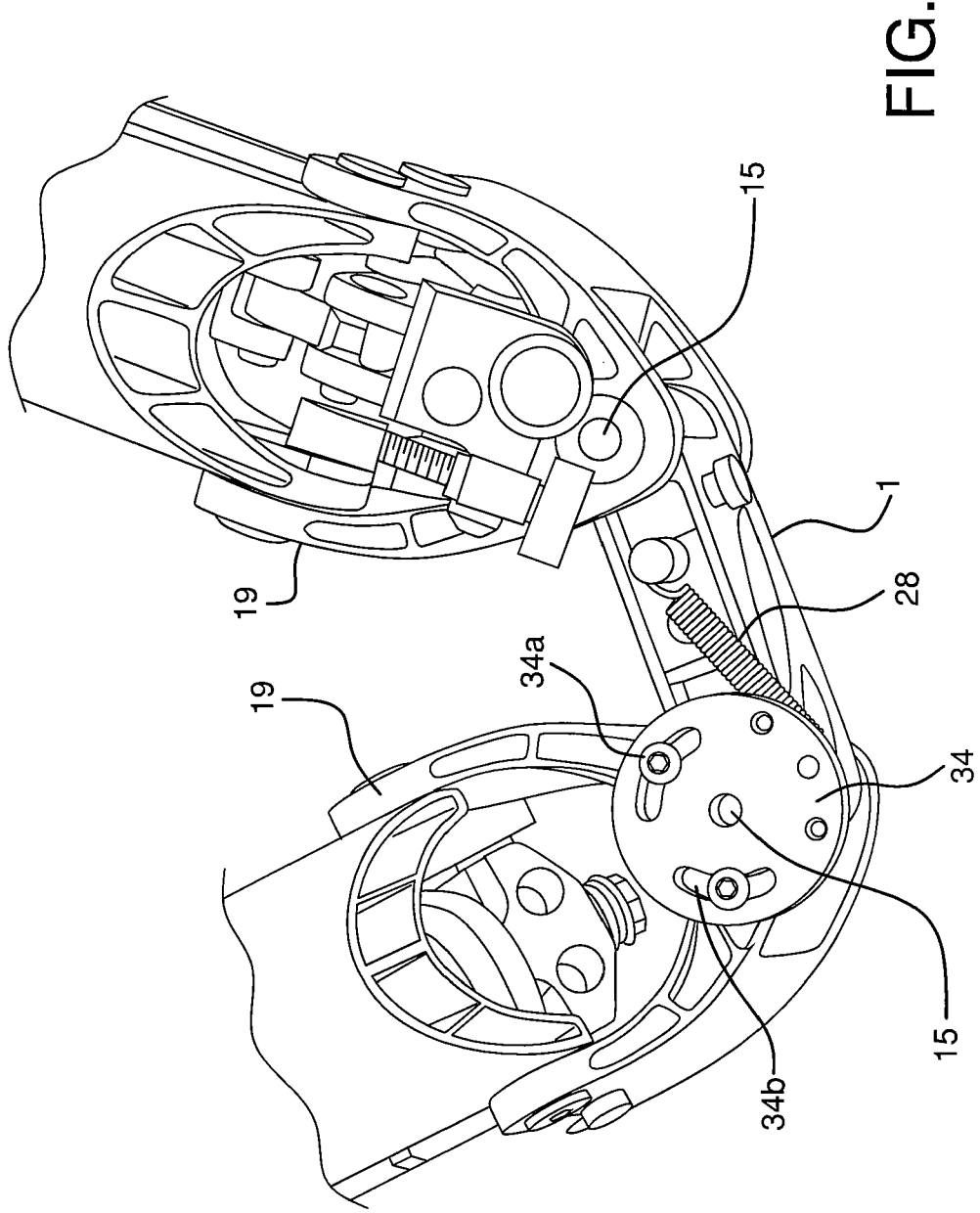
FIG. 13 illustrates spring deflection with parallelogram arm segment rotation according to an illustrative embodiment of the invention.

FIG. 13 illustrates forcible deflection of spring 28 caused by rotation of arm end block 19 and attached spring termination adjustment disc 34 in an illustrative embodiment of the invention. Since hinge pivot pins 15 (one partly hidden) are maintained in a vertical position, relatively small biasing forces around hinge pivot pin centerlines will impel end block 19 to return to (in this example) a substantially straight-line orientation with respect to hinge 1.

Figure 14:
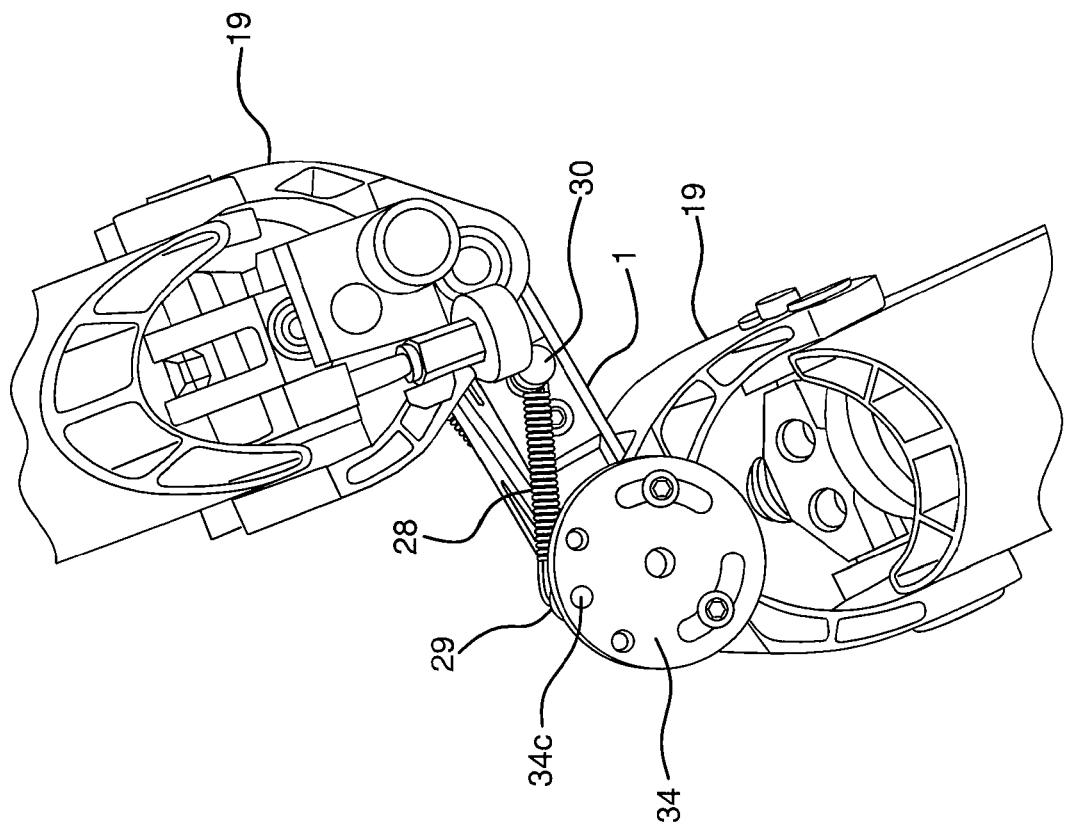
FIG. 14 illustrates spring deflection with parallelogram arm segment at the opposite extreme of rotation, as compared to FIG. 13, according to an illustrative embodiment of the invention.

FIG. 14 illustrates end block 19 and attached spring termination disc 34 forcibly rotated to the opposite angular extreme with respect to hinge 1, as compared to the position depicted in FIG. 13, so that spring 28 resiliently connects offset axle at location 34c with hinge-mounted axle 30, oppositely biased, as compared to FIG. 13, to return to a linear orientation with hinge 1.

Figure 15:
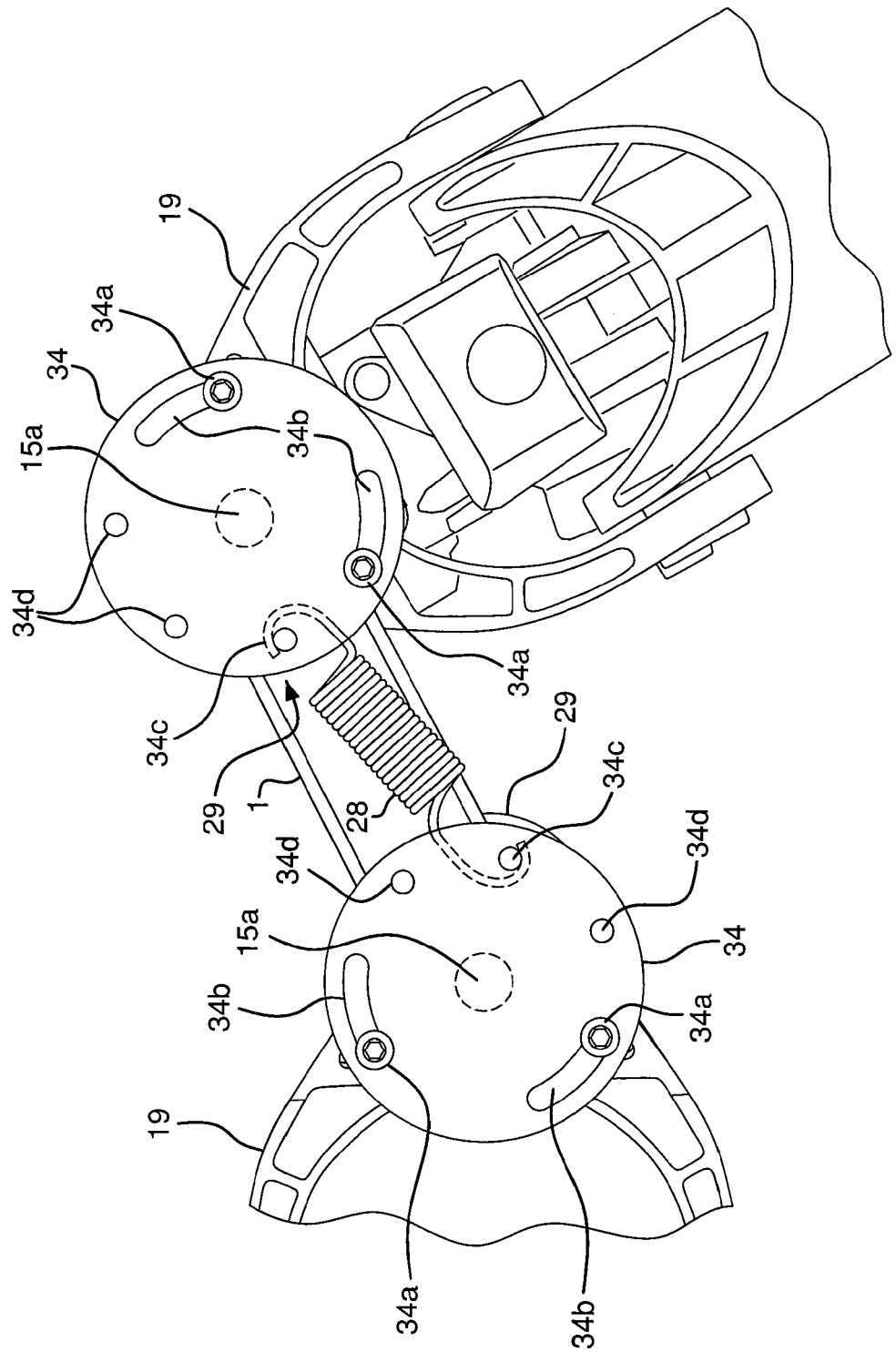
FIG. 15 illustrates the effect of two differently selected and adjusted hinge-side spring attachment offsets to produce separately desirable end-block to hinge biases according to an illustrative embodiment of the invention.

FIG. 15 illustrates the effect of two differently selected and adjusted hinge-side spring attachment offset locations 34c to produce different respective biases between end-blocks 19 and hinge 1, according to an illustrative embodiment of the invention. A single tension spring 28, acts directly between offset axles 29 (not visible) to resiliently pull them toward each other and thus orient their respectively attached end blocks 19 to seek a desired angular relationship. In this example, respective spring termination discs 34 are rotated by means of slots 34b and locking screws 34a to different orientations, and different hinge-side offset positions are chosen for spring axles 29 (not shown) from among the alternate axle locations 34d. The illustrated choices and respective adjustments tend to maintain the relative orientation of end blocks 19 illustrated in this example.

Figure 16:
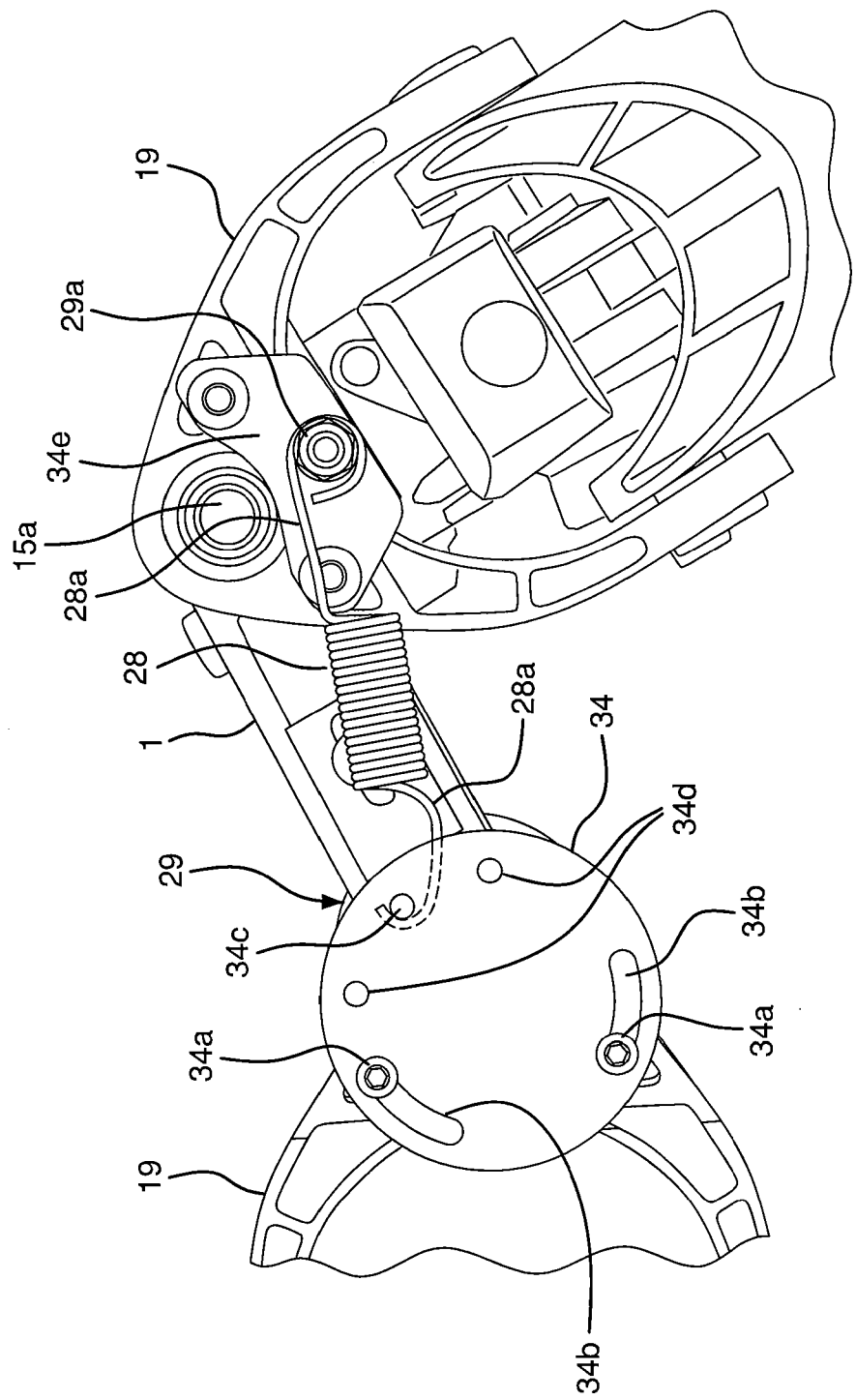
FIG. 16 illustrates the effect of combining a hinge-side offset axle with an over-centers offset axle to produce end-block to hinge biases that can be oriented in either a 'right-handed' or 'left-handed' configuration according to an illustrative embodiment of the invention.

FIG. 16 Illustrates the effect of combining hinge-side offset axle 29d (hidden) with over-centers offset axle 29a to produce bias end-blocks 19 to hinge 1 in a manner that can be oriented in either a 'right-handed' or 'left-handed' configuration. A single resilient means (spring 28 with extended attachment hooks 28a, for example) resiliently connects hinge-side spring offset attachment location 34c with overcenters offset spring axle 29a (attached to end block 19 by means of mounting plate 34e), such that both end blocks 19 are simultaneously biased to the illustrated 90 degree relative orientation. A feature of this spring attachment geometry is that end block 19 can be forcibly re-oriented 180 degrees, causing the spring to 'cross centers' by passing over pivot centerline 15a and thus bias end block 19 to retain the opposite orientation with respect to hinge 1.

Figure 17:
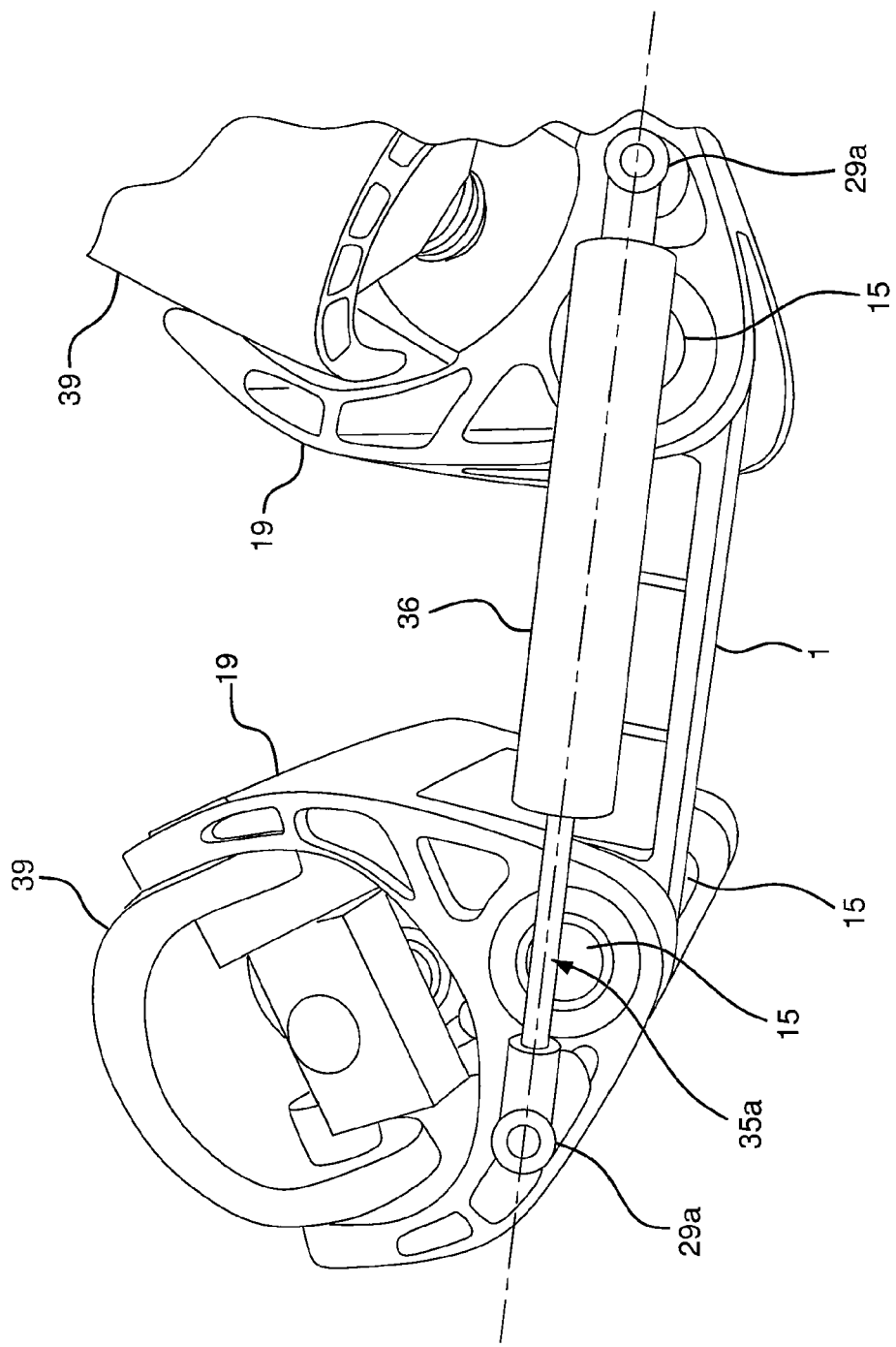
FIG. 17 is an inverted bottom-elevation of a central arm hinge according to an illustrative embodiment of the invention.

FIG. 17 is an inverted bottom-elevation of a central arm hinge 1 showing a compression gas-spring 36 attached between axles 29a which are respectively offset from the hinge pivot locations 15 on the respective arm segment end-blocks 19 to bias them to seek the angular relationships shown. The illustrated offset positions for axles 29a, will therefore be mutually displaced by the action of gas spring 36, to the farthest-apart positions attainable, which, if not restricted by mechanical interferences, and if displaced relatively symmetrically, will achieve equilibrium and come to rest with the gas spring centerline 36 roughly co-planar with the hinge body 1. This will cause end-blocks 19 to more or less strongly maintain their relative angular orientation, depending on the spring rate of gas spring 36 and on the magnitude and direction of the offset distances between axles 29a and hinge pivots 15.

Figure 18:
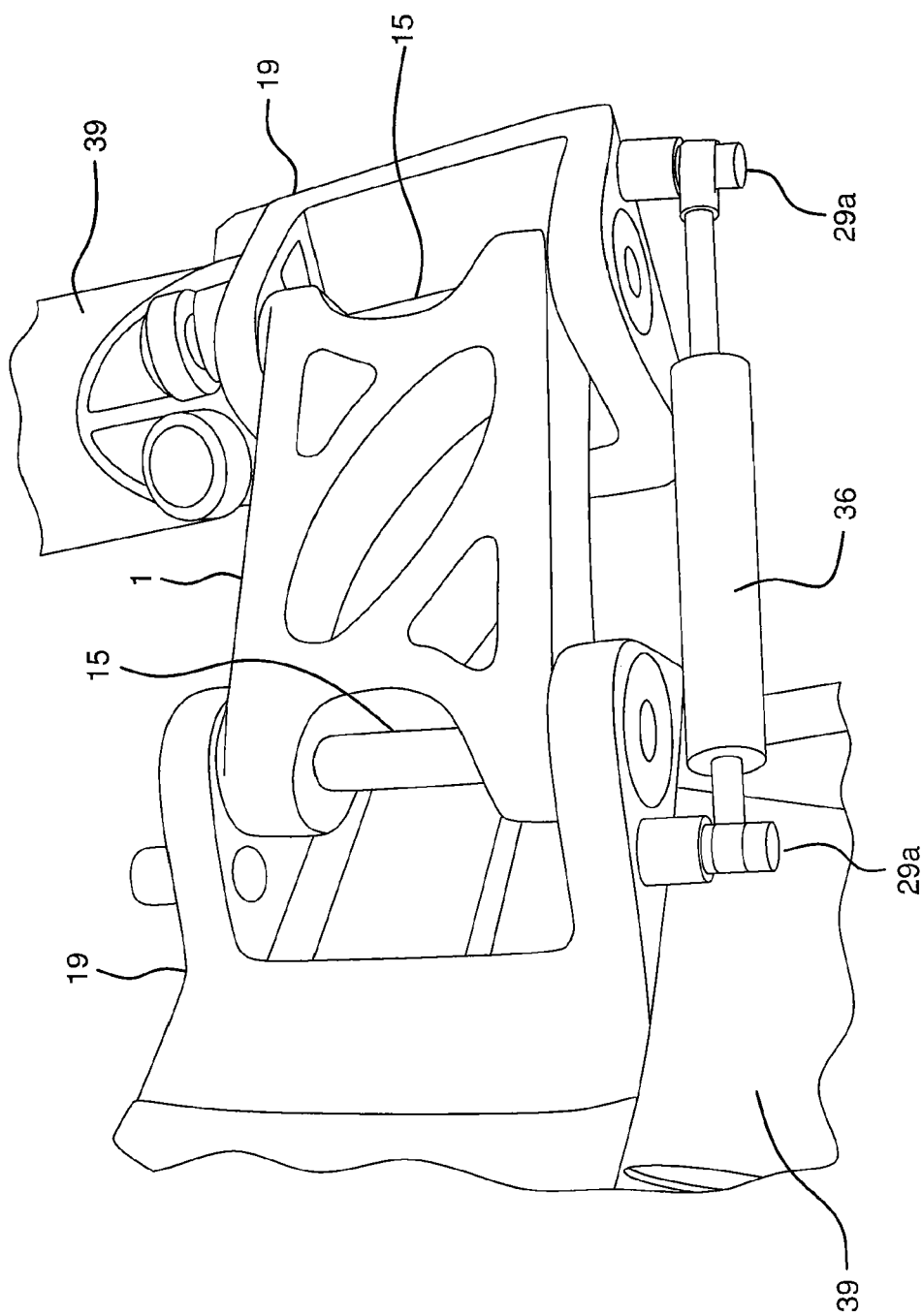
FIG. 18 is a right-side-up side-elevation of a hinge according to an illustrative embodiment of the invention.

FIG. 18 is a right-side-up side-elevation of resilient means 36 of FIG. 17 further illustrating the relationship between the locations of offset axles 29a and central hinge 1 between arm end blocks 19.

Figure 19:
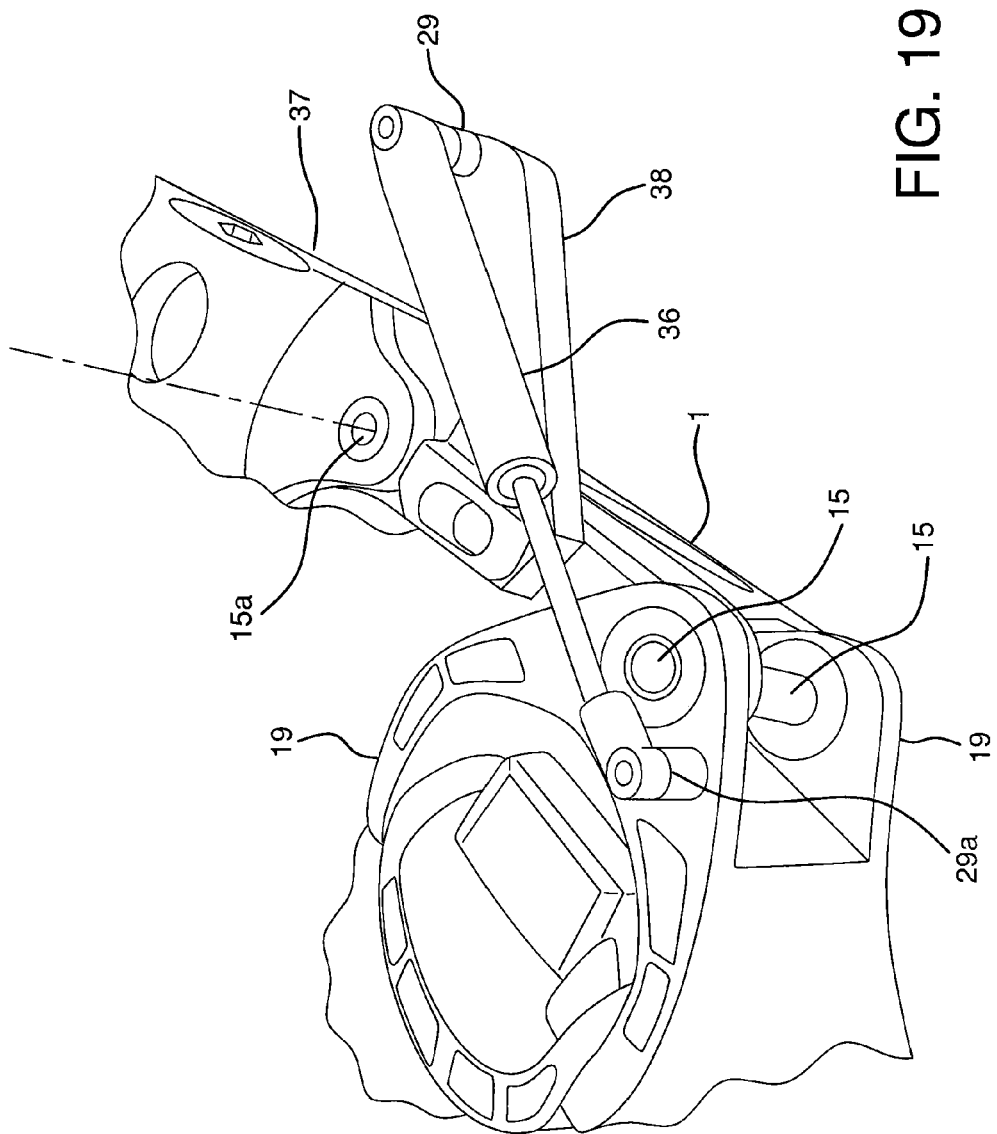
FIG. 19 is an upside-down isometric bottom-elevation of a terminal arm hinge according to an illustrative embodiment of the invention.

FIG. 19 is an upside-down isometric bottom-elevation of a terminal arm hinge 1 showing compression gas spring 36 attached between overcenters axle 29a on the arm-segment end-block as offset from the hinge pivot position, and opposite spring axle position 29 fixedly associated with hinge body 1, but offset on mounting bracket 38. As shown, axle 29a is forcibly pushed apart from axle 29 by action of compression-spring 36, such that end block 19 assumes the approximate angular position shown with respect to the plane of hinge body 1. As illustrated, the relative orientation of hinge body 1 and main arm mounting bracket 37 are not influenced by the action of gas spring 36 because axle 29 is shown fixedly attached to and angularly associated with hinge body 1, which may, in this embodiment, swing freely around hinge pivot pin centerline 15a.

The gas spring can also be employed by attaching a first end of the gas spring to a first end block, offset from the axis of rotation of the hinge body with respect to the end block, and attaching the other end of the gas spring to a termination point on the hinge body. This biases the end block with respect to the hinge body. Having the gas spring attached to points at each of the end blocks, as opposed to on the hinge body biases the end blocks with respect to the hinge body, but also with respect to each other. To bias two end blocks separately, a gas spring can be employed for one end block on one side of the apparatus and a second gas spring can be employed for the second end block on the other side of the apparatus. This holds true for all biasing systems described herein. Different types of biasing systems can also be used at each end of the hinge body.

It is also noted that offset brackets can be used in all cases to position the termination point of a biasing component at a location not directly on the hinge body or end block.

Figure 20:
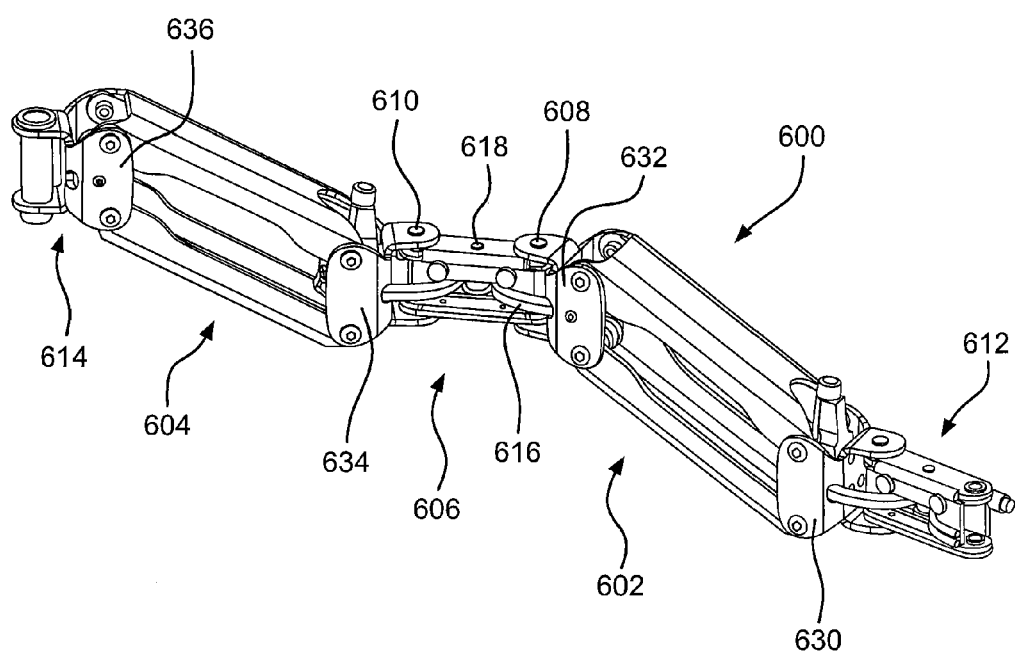
FIG. 20 depicts a support arm according to an illustrative embodiment of the invention.

FIG. 20 depicts a support arm having another biasing mechanism according to an illustrative embodiment of the invention. Support arm 600 includes a proximate support arm segment 602 hinged to distal support arm segment 604 by hinge system 606. Proximate support arm segment 602 has first and second end blocks 630, 632. Distal support arm segment has end blocks 634, 636. Proximate support arm segment 602 is pivotally attached to hinge system 606 at proximate pivot 608. Distal support arm segment 604 is pivotally attached to hinge system, 606 at distal pivot 610. Proximate support arm segment 602 and distal support arm segment 604 are "lifting sections" of support arm 600, configured to have motion substantially perpendicular to the axially motion around proximate pivot 608 and distal pivot 610.

Tensile members 616 extend through shoulder hinge 612, proximate support arm segment 602, hinge system 606, and distal support arm segment 602. Tensile members can take on forms, for example, springs, cords, cables, ropes, flat members, and other elongated objects that can be implemented as described herein. The tensile members may be resilient or non-resilient. In this illustrative embodiment, tensile members 616 have termination points in shoulder hinge 612 and distal support arm segment 604. It is noted that when a termination point is described herein as being "in" a component it includes being on the surface of the component, and when a termination point is described herein as being "on" a component, it includes on and within it. Also, a tensile member extending "into" a component is not limited to it being internal to the component, but can extending along an external path. Tensile members 616 are disposed around axle 618, which may be rotatable, and which is located between, and substantially parallel to proximate pivot 608 and distal pivot 610. It is noted that the phrase "termination point" does not necessarily indicate a single point, but may be a small general area.

Proximate support arm segment 602 is further pivotally attached to shoulder hinge 612. Shoulder hinge 612 may be attached, for example to a stationary support, such as a wall or column for example, or a support secured onto a moveable object, such as a cart.

Distal support arm segment is 604 is further pivotally attached to base connection component 614. Base connection component 614 may be further attached to various types of equipment and equipment holders. The term "equipment" as used herein is used very broadly, and includes for example, tools, cameras and other objects.

Figure 21:
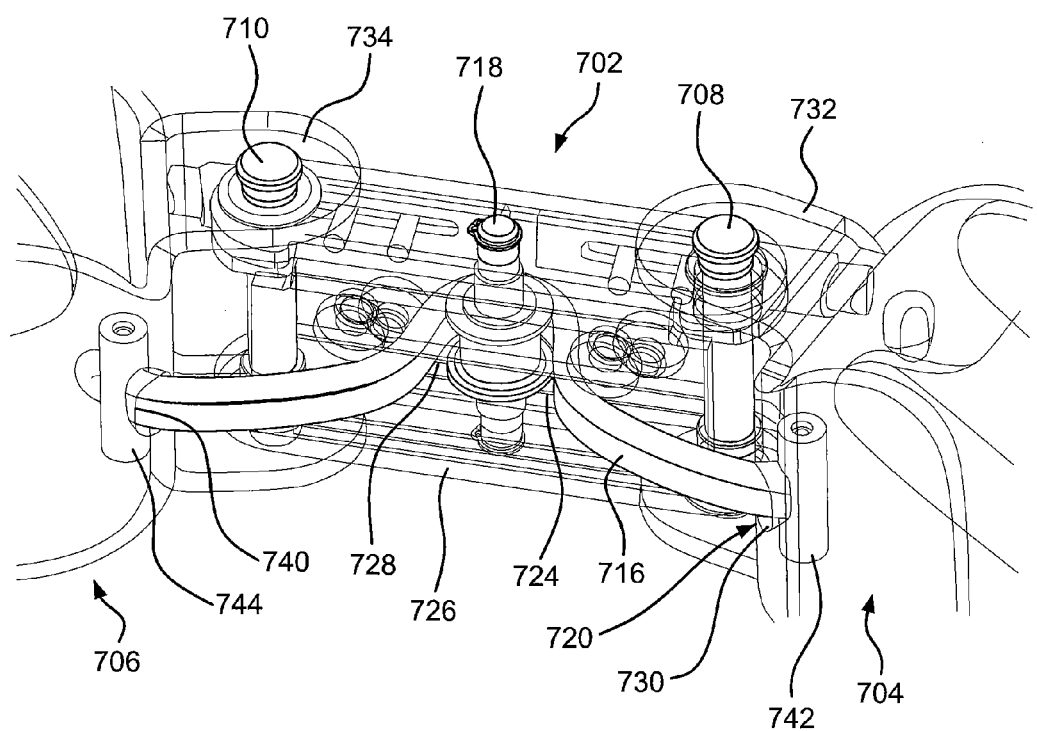
FIG. 21 depicts a hinge according to an illustrative embodiment of the invention.

FIG. 21 depicts a hinge system according to an illustrative embodiment of the invention. Hinge system 702 is pivotally connected to proximate support arm segment 704 at proximate pivot 708. Proximate support arm segment 702 includes end block 732. Hinge system 702 is further connected to distal support arm segment 706 at distal pivot 710. Distal support arm segment 704 includes end block 734. An axle 718 is located in an area between and substantially parallel to pivots 708, 710. Tensile members 716 are disposed around axle 718. First ends of tensile members 716 are routed through an opening 724 in hinge body 726, and second ends are routed through an opening 728 in hinge body 726. The first tensile member ends are then routed through hole 730 in end block 732 and the second tensile member ends are routed through hole 740 in end block 734. Tensile members 716 are anchored at termination points 720 in proximate support arm segment end block 732 and at termination points in distal support arm segment end block 734. Alternatively, a single tensile member can be used having a first end secured at anchor 742. The tensile member is then routed through hole 730 in end block 732, into hinge body 726 through hole 724, around axle 718, out of in hinge body 726 through hole 728, into end block 734 through hole 740, then looped through anchor 744, then back through holes 740, 728, 724, and 730 and secured at anchor 742. Tensile members 716 can be pulled to the desired tension and secured at anchors 742, 744 to provide a chosen bias and range of motion of the support arm. It is noted that the biased position may be referred to throughout as the centered position or similar phrase, however, it does not necessarily mean that the arm is midway between and two particular points. Tensile member 716 can be routed on either side of the support arm to provide the desired range of motion.

Figure 22:
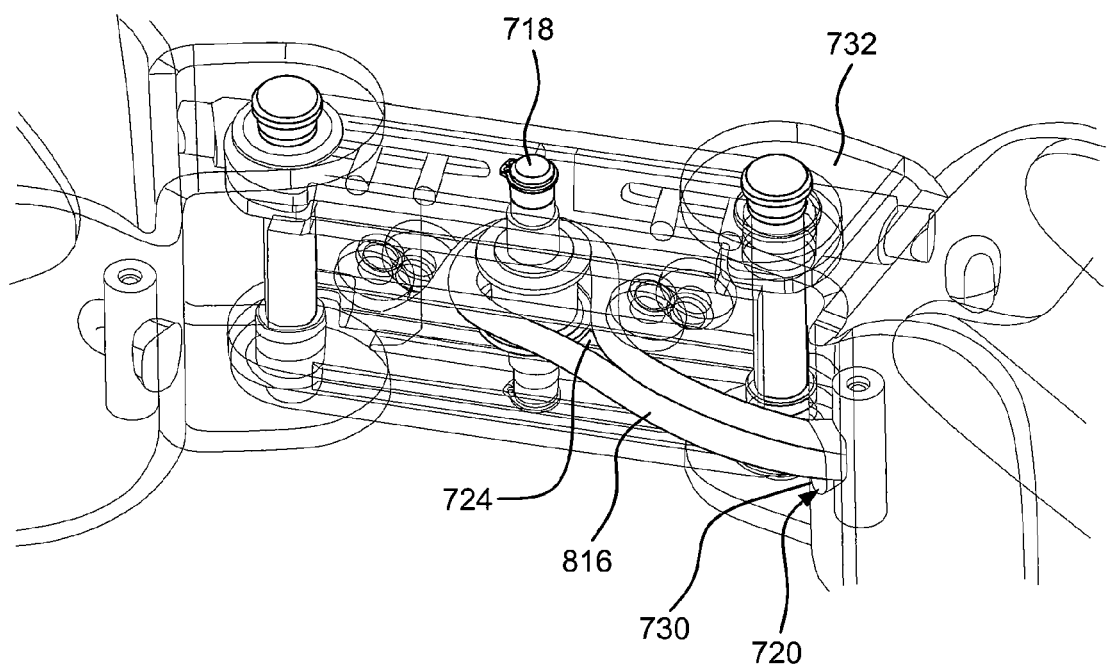
FIG. 22 depicts a hinge according to a further illustrative embodiment of the invention.

FIG. 22 depicts a hinge according to a further illustrative embodiment of the invention. A first end of tensile member 816 is anchored at a termination point 720 in proximate support arm end block 732. Tensile member 816 is routed through opening 730 in end block 732, then into hinge body 726 through opening 724 and around axle 718. Tensile member 816 then passes out of hinge body 726 through hole 724 and into end block 732 though hole 730. The second end of tensile member 816 is then anchored at a termination point 720 in proximate support arm end block 732. Tensile member 816 can be pulled to the desired tension and secured at anchor 742 to provide a chosen bias and range of motion of the support arm. Tensile member 816 can be routed on either side of the support arm to provide the desired range of motion.

Figure 23A:
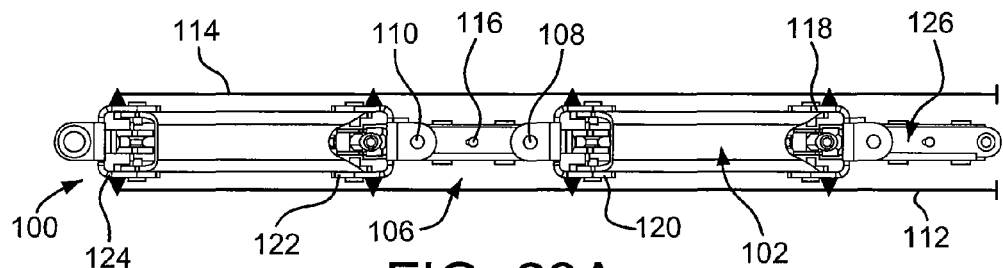
FIGS. 23A-F depict a support arm, including tensile member paths, according to illustrative embodiments of the invention.

FIGS. 23A-F depict a support arm, including tensile member paths, according to illustrative embodiments of the invention. Support arm 100 includes proximate support arm segment 102 and distal support arm segment 104. Proximate support arm segment 102 is pivotally connected to hinge system 106 at pivot 108. Distal support arm segment 104 is pivotally connected to hinge system 106 at pivot 110. Support arm 100 in FIG. 23A includes a first tensile member 112 and a second tensile member 114. Tensile members 112, 114 are disposed on opposite side of support arm 100. In this particular embodiment, tensile members 112, 114 are not disposed around an the axle 116 present between proximate pivot 108 and distal pivot 110. In FIGS. 23A-F the connection points of the tensile members to the remaining support arm structure are represented by triangles to show the general locations, and are not meant to be a true depiction of the connections. FIG. 23A shows connection points at a proximate support arm end blocks 118, 120 and at distal support arm end blocks 122, 124. Termination points for tensile members 112, 114 are at distal end block 124 and at, near or beyond shoulder hinge 126. A similar configuration can be achieved with a single tensile member disposed along a path from proximate end to distal end on one side of support arm 100, then across support arm 100 and finally from distal end to proximate end along the opposite side of support arm 100.

Figure 23B:
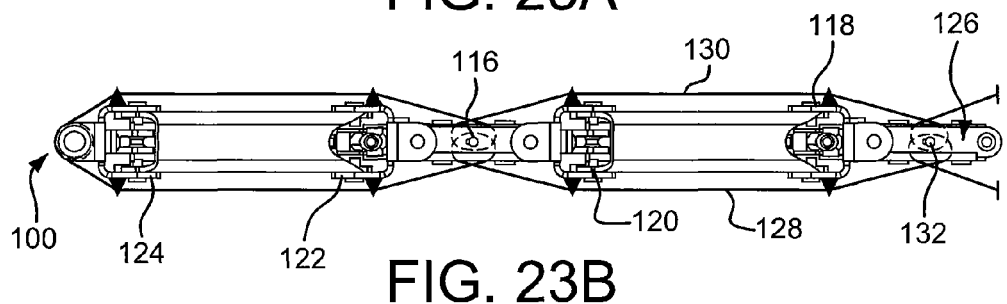

FIG. 23B depicts support arm 100 with tensile members 128, 130. In this embodiment, tensile members 128 and 130 are each looped around axle 116. They are also looped around axle 132 in shoulder hinge 132. Tensile members 128, 130 are disposed on opposite sides of support arm 100. The looped path causes each of tensile members 128 and 130 to remain on one side of support arm 100 throughout its path. It is noted that tensile members 128, 130 may be partially looped around axles 116 and/or 132, in which case they will cross over so that a portion of a single tensile member's path may span one side of support arm 100, and a portion may span the opposite side. FIG. 23B shows connection points at a proximate support arm end blocks 118, 120 and at distal support arm end blocks 122, 124. Termination points for tensile members 112, 114 are at distal end block 124 and at, near or beyond shoulder hinge 126.

Figure 23C:
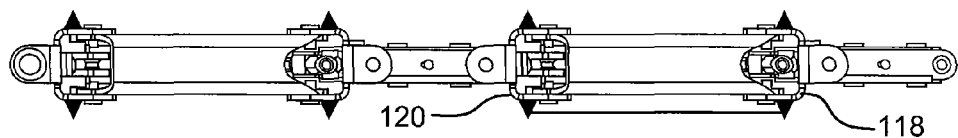

FIGS. 23C-F depict support arm 100 with various tensile member termination points and paths. FIG. 23C includes a tensile member having a first termination point at shoulder hinge 126, a connection point at end block 118, and a second termination point at end block 120.

Figure 23D:
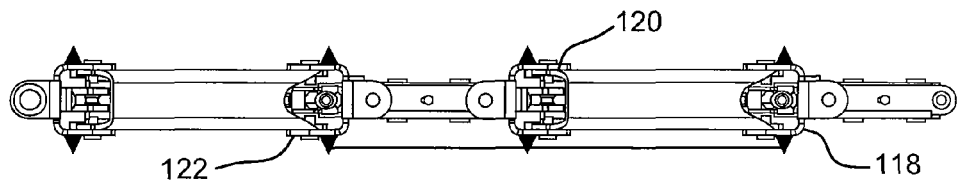

FIG. 23D includes a tensile member having a first termination point at proximate support arm segment end block 118, a connection at end block 120, and a second termination point at distal support arm segment end block 122.

Figure 23E:
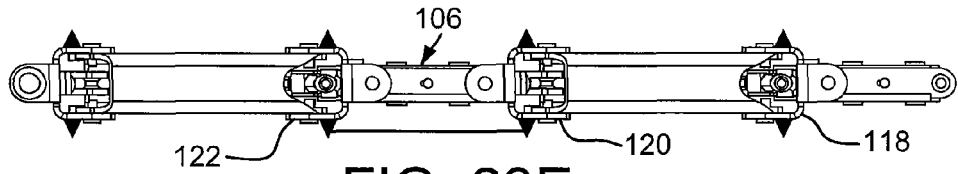

FIG. 23E includes a tensile member having a first termination point at proximate support arm segment end block 120 a second termination point at distal support arm segment end block 122, thus spanning hinge system 106.

Figure 23F:
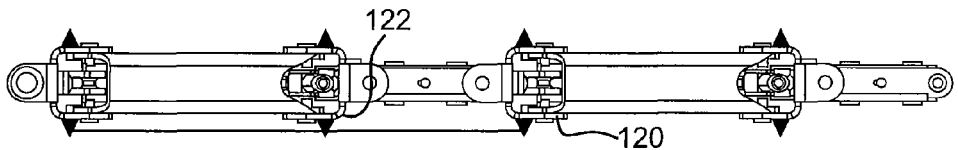

FIG. 23F depicts support arm 100 with a tensile member having a first termination point at proximate support arm segment end block 120, a connection at distal support arm segment end block 122, and a second termination point at end block 124.

The tensile members need not run in a parallel plane to the support arm. When spanning a plane that is non-parallel to the support arm, the tensile members can affect both the vertical and horizontal motion of the support arm. In the case where the tensile member is non-parallel to the horizontal support arm segments, its apparent length will change as the arm elevates. If this tensile member is instead non-elastic it will limit the range of vertical motion. If it passes across at least one lateral joint such that its effective length available to allow vertical motion is changed, then it will have a resulting effect on total vertical range as a function of lateral position. If it is an elastic element it may either contribute to or defeat lift in conjunction with the lateral position change.

Although an axle is shown between the distal and proximate pivots in FIGS. 23A-F, such an axle is not always necessary in the various embodiments of the invention. The axle, when present, may be stationary or pivotable.

Numerous configuration of tensile members are within the scope of the invention. When two are more tensile members are present some or all may extend to substantially the same terminations points and follow substantially identical paths, or the paths and termination points may vary. By using multiple tensile members, the strength or integrity of the system may be increased, and the resilience or tension of the combined members may differ than that of a single member.

Two or more tensile members may be used having different lengths and/or difference degrees of resiliency. Such configurations can provide different biasing forces for various points in the arm's range of motion. For example, if two tensile members are used in a configuration such that the initial arm motion only engages the first member, and then subsequent arm motion engages the second tensile member the initial arm motion would be biased by a first amount and the subsequent arm motion would be biased by a different amount. Thus for example, the arm can move more freely over a small initial range and then less freely over the remained of the range.

Each arm segment or hinge may also be biased differently by use of a plurality of tensile members secured at different points in the arm and spanning different lengths.

Figure 24:
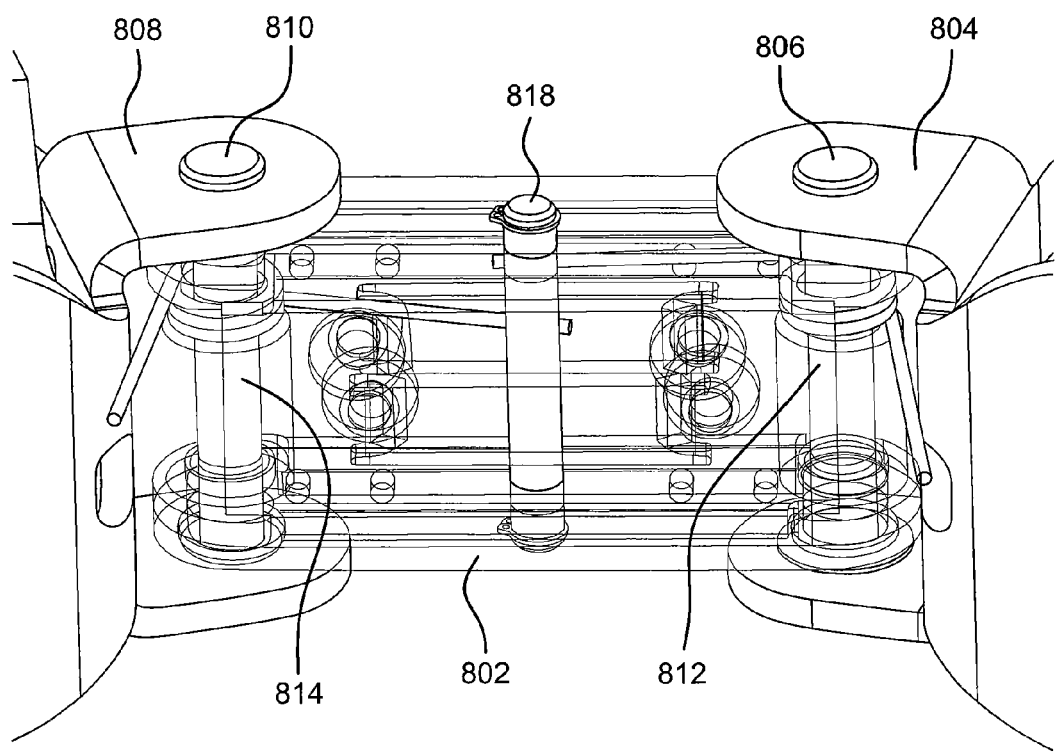
FIG. 24 depicts a hinge according to yet another an illustrative embodiment of the invention.

FIG. 24 depicts a hinge according to an illustrative embodiment of the invention. Hinge body 802 is pivotally attached to end block 804 at pivot 806. Hinge body 802 is pivotally attached to end block 808 at pivot 810. End blocks 804, 808 may be attached to segments of a support arm. Torsion spring 812 is disposed around pivot 806 and has a first end that contacts end block 804, and a second end that contacts axle 818, thus biasing the components attached at pivot 806 to rotate in a desired range of motion. The specific range will depend, at least in part on the positioning of torsion spring 812 and its spring constant (torsion coefficient).

A second torsion spring 814 can be utilized to further bias the support. Torsion spring 814 is disposed around pivot 810 and contacts end block 808, thus biasing the components attached at pivot 810 to rotate in a desired range of motion.

An illustrative range of motion is about 0° to about 200°.

Left or right hand torsion springs can be installed to control the bias directions.

Figure 25:
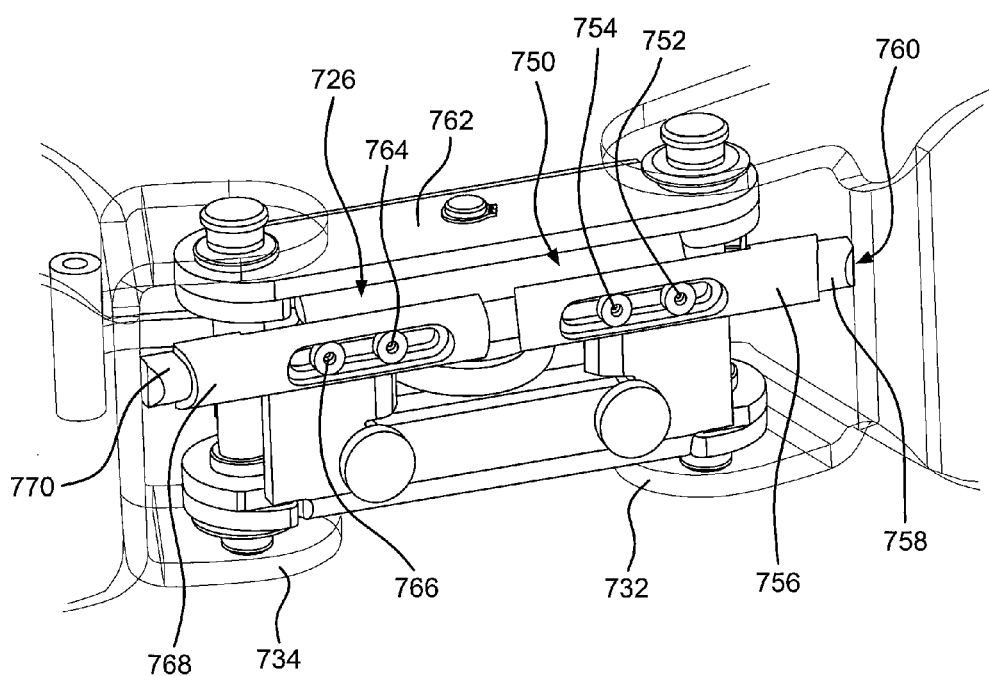
FIG. 25 depicts a hinge with limit stops according to an illustrative embodiment of the invention.

FIG. 25 depicts a hinge with limit stops according to an illustrative embodiment of the invention. A rotation limit stop 750 is mounted to hinge body 726 by screws 752, 754 to limit the extent of angular motion of end block 732 and thus proximate support arm segment 704, with respect to hinge body 726. Rotation limit stop 750 includes a first stop component 756 having a second stop component 758 slidable with respect to first stop component 756. In a particular embodiment of the invention, first stop component 756 is hollow and second stop component 758 is slidably disposed therein.

Screws 752, 754 secure second stop component 758 within first stop component 756 at a desired position. The position of second stop component 758 can be adjusted toward and away from a contact point 760 on end block 732 of proximate support arm segment 702. When second stop component 758 encounters contact point 760, the angular motion of arm segment 702 with respect to hinge body 726 is at a maximum.

Similarly, a second rotation limit stop 762 can be mounted to hinge body 726 by screws 764, 766 to limit the extent of angular motion of end block 734 and thus distal support arm segment 706, with respect to hinge body 726. Rotation limit stop 762 includes a first stop component 768 having a second stop component 770 slidable with respect to first stop component 756. In a particular embodiment of the invention, first stop component 768 is hollow and second stop component 770 is slidably disposed therein.

Other rotation limit stops and associated adjustment mechanisms are within the scope of the invention, provided they act to limit the range of motion of the arm segments with respect to the hinge body. Limit stops can also be incorporated that are not adjustable.

The rotation limit stops may also be secured to the support arm by devices other than screws. Welding, glue, and solder are examples of other mechanisms that can be used to secure the rotation limit stop to the support arm.

It is also noted that the rotation limit stop may be secured to an arm segment, such as on an end block, with the contact point being on the hinge body or an element attached thereto.

In an exemplary embodiment of the invention, the limit stops allow a rotational range of motion from about 0° to about 200°. Additional illustrative rotational ranges include about 15° to about 180°, and about 20° to about 140°.

Figure 28:
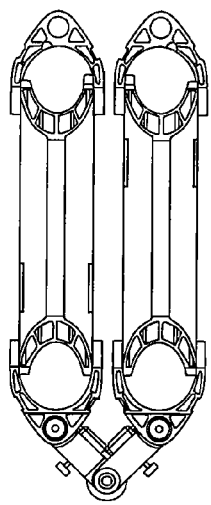
FIG. 28 depicts a top view of a hinge having a friction clutch assembly according to an illustrative embodiment of the invention.
Figure 29:
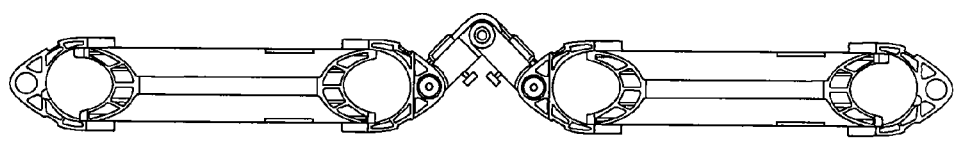
FIG. 29 depicts a bottom view of a hinge having a friction clutch assembly according to an illustrative embodiment of the invention.

FIGS. 26-33 depict a hinge assembly having a single axial bearing and quick release barrel assembly according to a further embodiment of the invention. FIG. 26 is a "left" side view and FIG. 27 is a "right" side view. "left" and "right" as used with respect to this hinge are relative terms that are not limiting because of the reversible nature of the hinge assembly, which will be discussed in more detail below. FIGS. 28 and 29 depict a top view of a closed and open hinge assembly according to an illustrative embodiment of the invention. The terms "top" and "bottom" are also only relative terms and not intended to be limiting.

Proximate arm support segment 140 is attached to distal support arm segment 142 by hinge assembly 144. Hinge assembly 144 includes proximate hinge segment 156 and distal hinge segment 158. Proximate support arm segment 140 includes end block 146. Distal support arm segment 142 includes end block 148.

Hinge assembly 144 includes arm segment attachment points 150, 152 and pivot point 154. Proximate support arm segment 140 is rigidly attached to hinge assembly 144 at point 150. Distal support arm segment 142 is rigidly attached to hinge assembly 144 at point 152. Proximate hinge segment 156 is pivotally attached to distal hinge segment 158 at pivot 154. "Rigidly attached" as used herein means non-pivotally and securely attached, but not necessarily mean "permanently" attached, so for example, releasable connections can be considered to be rigid connections. The presence of pivot point 154 in conjunction with particular angular arrangements of the arm segments with respect to the hinge segments, allows the arm segments to be substantially parallel to one another when in a folded position. Although such a configuration is possible, the invention is not limited to that particular folded configuration. Embodiments of the invention include configurations wherein the arms are not substantially parallel in the folded position.

Figure 30:
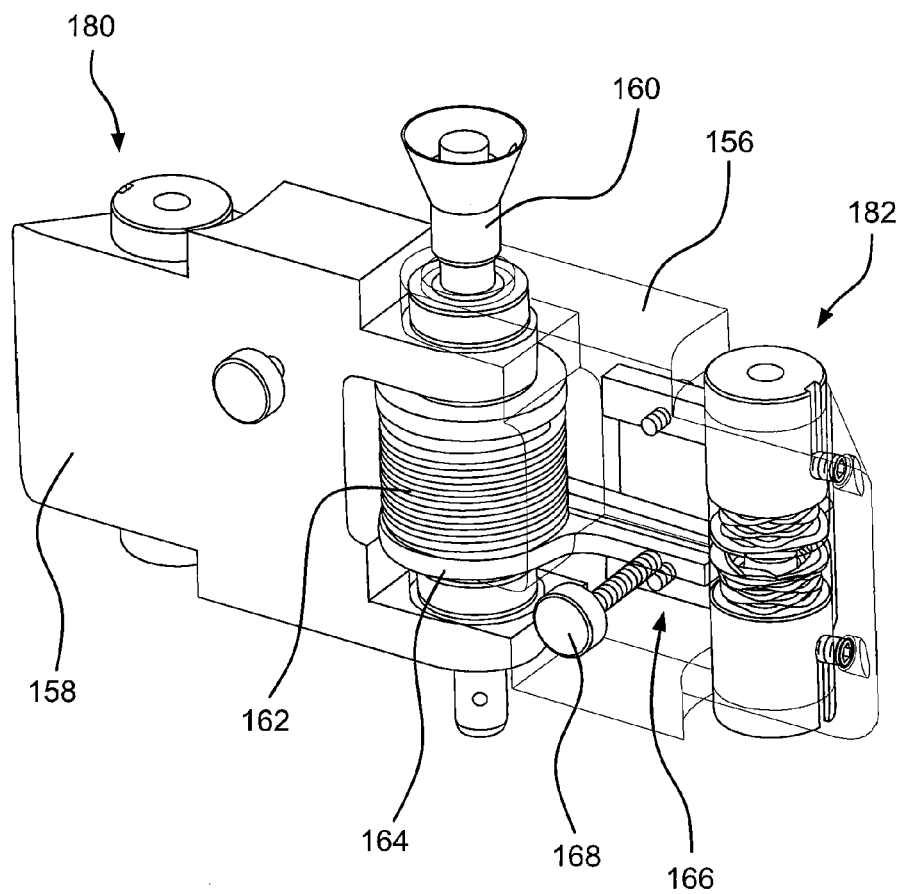
FIG. 30 depicts a friction clutch hinge assembly and barrel assembly according to an illustrative embodiment of the invention.
Figure 31:
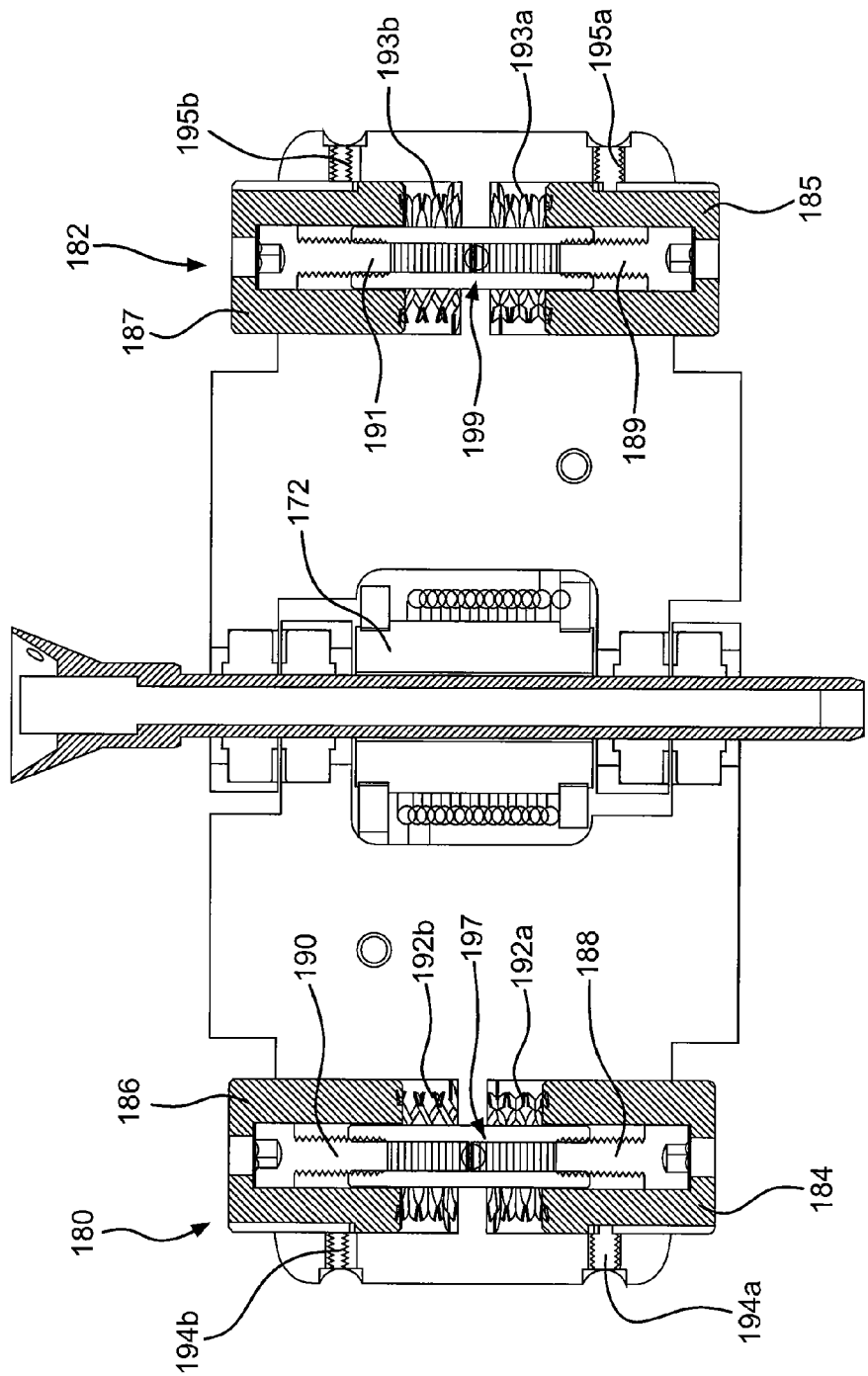
FIG. 31 depicts a cross sectional view a friction clutch hinge assembly and barrel assembly according to an illustrative embodiment of the invention.
Figure 32:
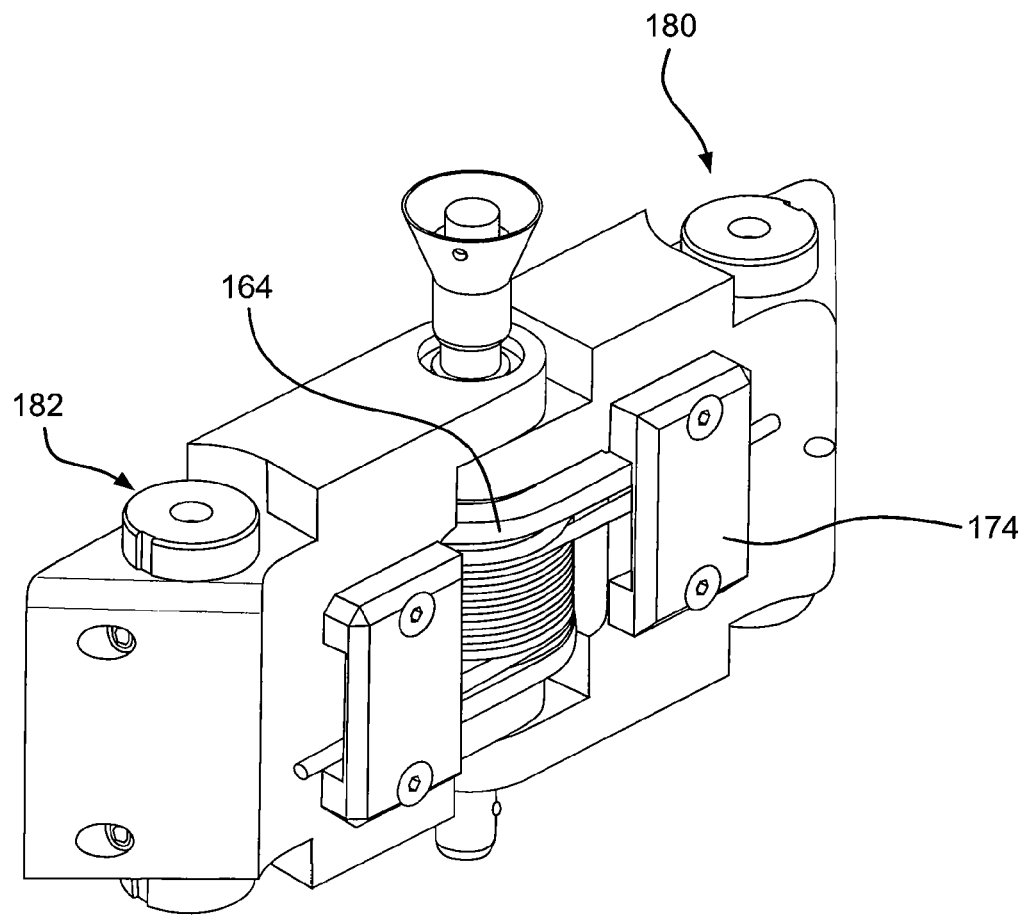
FIG. 32 depicts a spring and friction clutch band retainer of a friction clutch assembly according to an illustrative embodiment of the invention.
Figure 33:
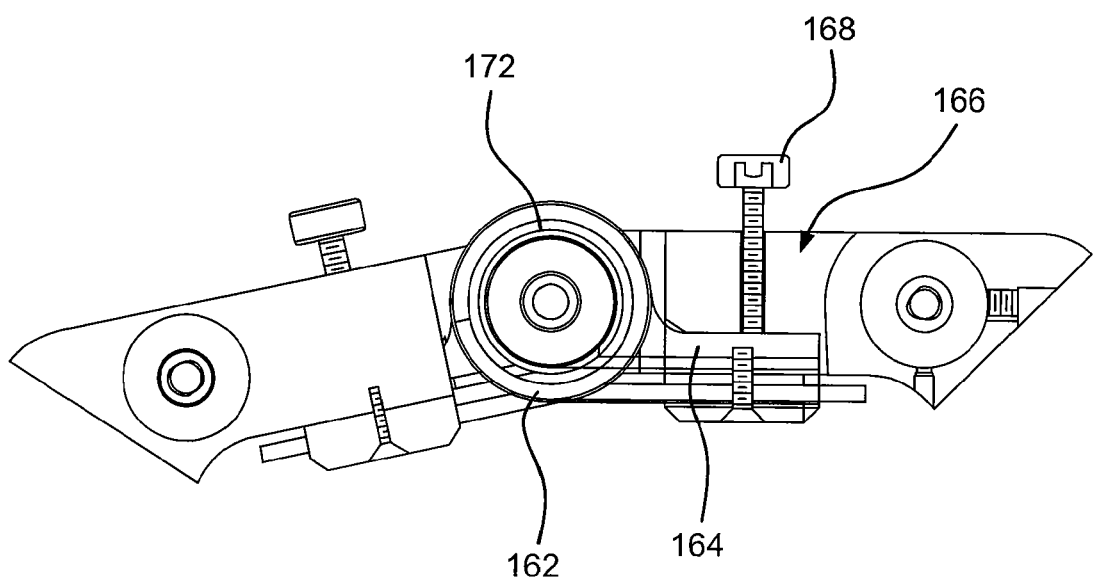
FIG. 33 depicts a hinge assembly according to an illustrative embodiment of the invention.

FIGS. 30-33 show the detail of hinge assembly 144. Hinge assembly 144 includes hinge pin 160, which may be a quick release pin. Hinge pin 160 pivotally attaches proximate hinge segment 156 to distal hinge segment 158. Torsion spring 162 is disposed around friction clutch drum 172, as shown in FIGS. 31 and 33. Friction clutch band 164 is disposed around friction clutch drum 172. Friction clutch band 164 can be adjusted by friction clutch adjustment device 166, which is shown as a thumbscrew 168 in FIGS. 30 and 33. As can be seen in FIG. 33, friction clutch band adjustment thumbscrew 168 increases the radial force of the friction clutch band 164 upon friction drum 172, thereby increasing the effective load required to rotate proximate hinge segment 156 and distal hinge segment 158 around hinge assembly pivot 154. FIG. 32 depicts torsion spring 162 and friction clutch band 164 secured by retainer 174. Other retainer configurations are within the scope of the invention, provided they secure within hinge assembly 144 torsion spring 162 and friction clutch band 164 so they can provide resistance to rotationally motion of hinge segments 156, 158.

FIGS. 30 and 31 show proximate barrel assembly 180 and distal barrel assembly 182, which in this embodiment are designed to be quick release. Proximate barrel assembly 180 rigidly attaches proximate hinge segment 156 with proximate support arm segment 140. Distal barrel assembly 182 rigidly attaches distal support arm segment 158 with distal support arm segment 142.

FIGS. 30 and 31 also depict details of barrel assemblies 180, 182. Proximate barrel assembly 180 contains opposed mounting barrels 184, 186 having proximate barrel locking shaft 197 therein. Proximate locking screws 188, 190 are threadedly engaged within barrel locking shaft 197. Proximate mounting barrel extension springs 192*a-b* are disposed at an open end of mounting barrels 184, 186. Extension springs may be included on one mounting barrel or on each of the opposed mounting barrels.

When locking screws 188, 190 are driven toward each other, opposed mounting barrels 184, 186 may be compressed against extension springs 192*a-b* to allow the entire assembly to be removed "laterally," as viewed in FIG. 31, for example, from mating bores in the proximate support arm segment 142 and hinge assembly 144. This provides a "quick release" mechanism to disassemble the arm segments from the hinge assembly.

Dog screws 194*a-b* can be used to align the mounting barrels.

In the embodiments depicted in FIG. 31, distal barrel assembly 182 has the same components as proximate barrel assembly 180, opposed mounting barrels 185, 187, locking screws 189, 191, mounting barrel extension springs 193*a-b*, and dog screws 195*a-b*.

The barrel assemblies 180, 182 can be used in conjunction with the friction clutch assembly such as shown in FIGS. 30-33, or may be used with other assemblies. Likewise, the friction clutch assembly can be used with assemblies other than barrel assemblies 180, 182. Hinge assemblies described herein can be used between support arm segments or between a support arm segment and another component, such as a stationary support or tool holder.

Embodiments of the invention can be implemented having components substituted or reversed. For example, the shoulder hinge or base connection component may be attached to either the proximate or distal support arm segment. A rotation limit stop may be used to only limit the motion of the proximate support arm segment or the distal support arm segment, or stops can be incorporated to limit motion of both arm segments.

The various biasing systems described herein and their equivalents can be used alone or in conjunction with one another. For example, a hinge body may be connected to a first end block using a biasing system and to a second end block using a different biasing system.

The hinge apparatuses of the invention can be functionally connected to a support arm, such as the arm shown in FIG. 9, which has two parallelogram-shaped segments. In this illustrative embodiment of the invention, the two arm segments can be attached by a hinge apparatus having a biasing component between the hinge body and one arm segment or between the hinge body and each arm segment. If a biasing component is used at each end of the hinge, they may be the same or different type of biasing components. It is noted that the term "end block" when used in specification, including the claims, can mean the support equipment itself. In certain embodiments of the invention a support component, such as an arm may be functionally attached to the hinge body via an end block or may be functionally attached directly to the hinge body. The term "arm segment" is also used herein, which can include an end block and various other components.

A single parallelogram segment may also make up a support arm, and be functionally attached to the hinge body.

Embodiments of the invention further include methods of supporting equipment using the equipment support systems, support arms and hinges described herein and their equivalents.

Various embodiments of the invention have been described, each having a different combination of elements and steps. The invention is not limited to the specific embodiments disclosed, and may include different combinations of the elements and steps disclosed.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A support arm comprising;
    a proximate support arm segment;
    a distal support arm segment;
    a hinge system having a proximate end pivotally connected to the proximate support arm segment at a proximate pivot, the proximate pivot providing angular motion in a plane substantially perpendicular to a lifting plane of the proximate support arm segment and a distal end pivotally connected to the distal support arm segment at a distal pivot, the distal pivot providing angular motion in a plane substantially perpendicular to a lifting plane of the distal support arm segment;
    an elastic tensile member having a first end and a second end, the tensile member first end extending into and secured at a termination point either the proximate support arm segment or the distal support arm segment and beyond the associated pivot, and the tensile member second end extending into and secured at a termination point either the proximate support arm segment or the distal support arm segment and beyond the associated pivot, the tensile member thereby biasing one or both of the proximate support arm segment and the distal support arm segment about the proximate pivot or the distal pivot;

wherein the termination point is not coincident with the proximate pivot or the distal pivot and, an axle disposed substantially parallel to, and in an area between, the proximate pivot and the distal pivot, and wherein the tensile member is disposed at least partially around the axle.

2. The support arm of claim 1 wherein the tensile member first end extends into the proximate support arm segment and is secured at a termination point on or beyond the proximate support arm segment, and the tensile member second end extends into the distal support arm segment and is secured at a termination point on or beyond the distal support arm segment.

3. The support arm of claim 2 wherein the tensile member first end is secured at a termination point on the proximate support arm segment, and the tensile member second end is secured at a termination point on the distal support arm segment.

4. The support arm of claim 1 wherein the tensile member first end and the tensile member second end are secured at termination points on or beyond the same support arm segment selected from the proximate support arm segment and the distal support arm segment.

5. The support arm of claim 1 wherein the tensile member first end is secured at a termination point on a shoulder hinge, wherein the shoulder hinge is pivotally attached to the proximate support arm segment at an end opposite to the proximate pivot.

6. The support arm of claim 1 wherein the tensile member first end and the tensile member second end are secured at termination points on a shoulder hinge, wherein the shoulder hinge is pivotally attached to the proximate support arm segment at an end opposite to the proximate pivot.

7. The support arm of claim 1 wherein the tensile member second end is secured at a termination point on a base connection component, wherein the base connection component is pivotally attached to the distal support arm segment at an end opposite to the distal pivot.

8. The support arm of claim 1 wherein the tensile member first end and the tensile member second end are secured at termination points on a base connection component, wherein the base connection component is pivotally attached to the distal support arm segment at an end opposite to the distal pivot.

9. The support arm of claim 1 wherein the tensile member is resilient.

10. The support arm of claim 1 wherein the tensile member is non-resilient.

11. The support arm of claim 1 wherein the axle is rotatable.

12. The support arm of claim 1 comprising two tensile members, wherein both extend to substantially the same terminations points and follow substantially identical paths.

13. The support arm of claim 1 comprising two tensile members wherein the two tensile members are of different lengths.

14. The support arm of claim 1 comprising two tensile members wherein the two tensile members have different degrees of resiliency from one another.

15. The support arm of claim 1 comprising a second tensile member having to first end and a second end, wherein the first end of the first tensile member is secured at a different termination point than the first end of the second tensile member.

16. The support arm of claim 15 wherein the first tensile member second end is secured at as different termination point than the second tensile member second end.

17. The support arm of claim 1 comprising a second tensile member having a first end and a second end, wherein the first end of the first tensile member is secured at a termination point on a different component of the support arm than the first end of the second tensile member, and wherein the components include the proximate support arm segment, distal support arm segment, base connection component, shoulder hinge and a base.

18. The support arm of claim 17 comprising a second tensile member having a first end and a second end, wherein the second end of the first tensile member is secured at a termination point on a different component of the support arm than the second end of the second tensile member, and wherein the components include the proximate support arm segment, distal support am segment, base connection component, shoulder hinge and a base.

19. The support arm of claim 1 comprising two tensile members wherein the tensile members follow different paths from one another.

20. The support arm of claim 19 wherein the tensile members are dispersed on opposite sides of the support arm.

21. The support arm of claim 1 comprising a single tensile member having a path of which a portion is on one side of the support arm, and a portion is on the opposite side of the support arm.

22. The support arm of claim 1 wherein the tensile member's path is non-parallel to the longitudinal centerline of an arm segment.

23. The support arm Of claim 1 further comprising one or more rotation limit stops.

24. A method of supporting an object comprising:
attaching the object to a support arm according to claim 1;
adjusting the hinge system to provide a biasing force to bias the support arm to a selected position or range of positions.

25. The support arm of claim 1 where in the range of motion extends from about 0° to about 200°.

* * * * *